United States Patent [19]

Krause et al.

[11] Patent Number: 5,404,363

[45] Date of Patent: Apr. 4, 1995

[54] TWO-FAIL-OPERATIONAL FAULT-TOLERANT MULTIPLE CLOCK SYSTEM

[75] Inventors: James M. Krause, Maple Grove; Matthew J. Englehart, Minneapolis, both of Minn.

[73] Assignee: Honeywell Inc., Minneapolis, Minn.

[21] Appl. No.: 800,904

[22] Filed: Nov. 27, 1991

[51] Int. Cl.$^6$ ............................................. G06F 11/18
[52] U.S. Cl. ..................................................... 371/61
[58] Field of Search .................. 371/61, 36, 16.3, 4, 371/21.1–21.3, 27

[56] References Cited

U.S. PATENT DOCUMENTS

| | | | |
|---|---|---|---|
| 4,239,982 | 12/1980 | Smith et al. | 307/219 |
| 4,386,426 | 5/1983 | Pugh | 370/85 |
| 4,644,498 | 2/1987 | Bednard et al. | 371/36 |
| 4,683,570 | 7/1987 | Bedard et al. | 371/36 |
| 4,956,842 | 9/1990 | Said | 371/16.3 |
| 4,979,191 | 12/1990 | Bond et al. | 371/36 |
| 4,984,241 | 1/1991 | Truong | 371/36 |
| 5,233,617 | 8/1993 | Simmons et al. | 371/61 |

FOREIGN PATENT DOCUMENTS

0176464A3  4/1986  European Pat. Off. .
3023624   10/1981  Germany .

OTHER PUBLICATIONS

Ricky W. Butler, "Fault–Tolerant Clock Synchronization Techniques For Avionics Systems", Sep. 7–9, 1988, AIAA/AHS/ASEE Aircraft Design, Systems and Operations Meeting, Atlanta, Ga.

Ricky W. Butler, "A Survey of Provably Correct Fault-Tolerant Clock Synchronization Techniques", Feb. 1988, NASA Technical Memorandum 100553.

*Primary Examiner*—Hoa T. Nguyen
*Attorney, Agent, or Firm*—John G. Shudy, Jr.

[57] ABSTRACT

A multiple-fail-operational fault-tolerant clock having a plurality of interconnected and identical clock modules, that provides a fault tolerant clock signal despite some clock module failures. The clock incorporates fault-tolerant operational diagnostics so that a working clock module may be voted for supplying the output clock signal.

6 Claims, 30 Drawing Sheets

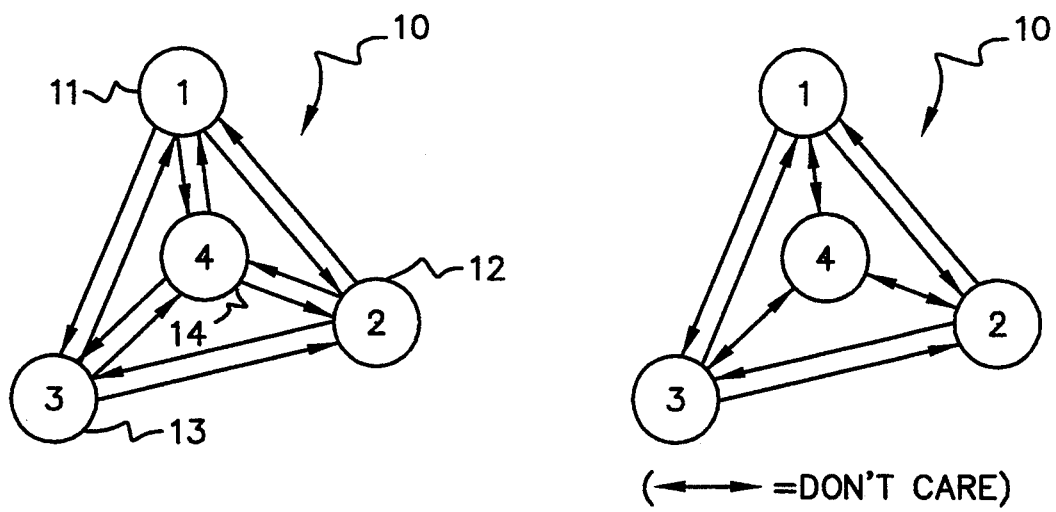
*FIG.12*     *FIG.13*
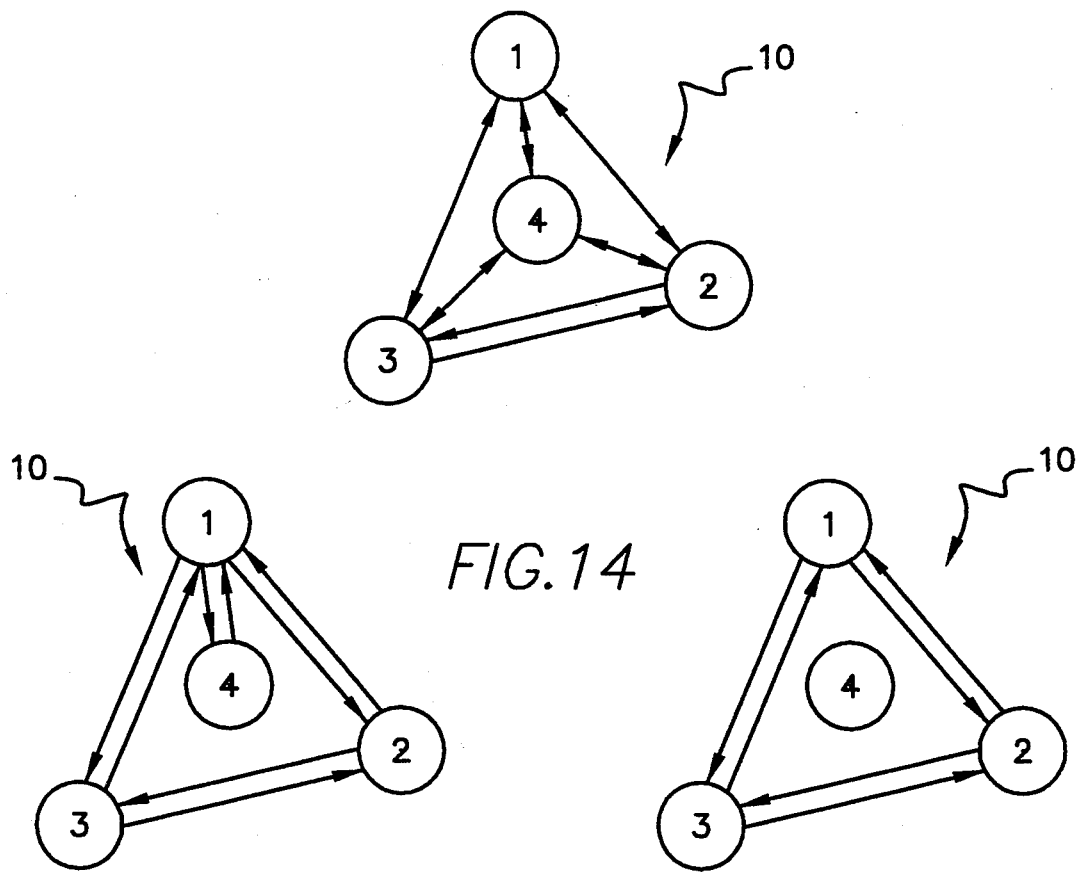
*FIG.14*
*FIG.16a*     *FIG.16b*

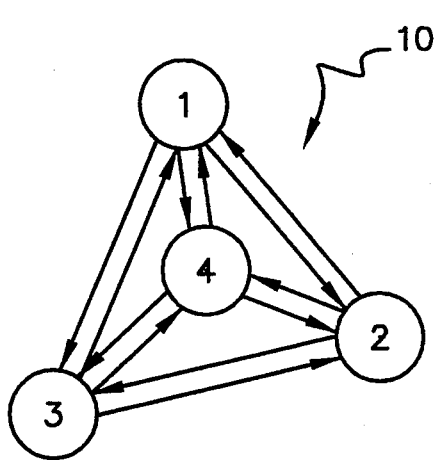
FIG.20a
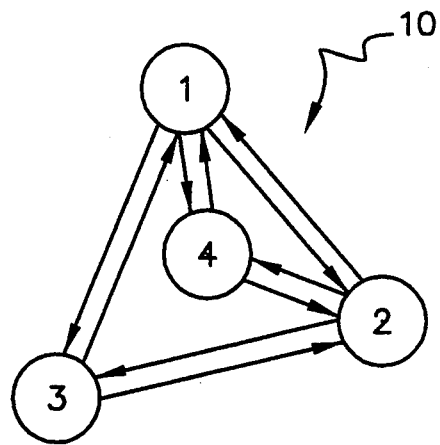
FIG.20b
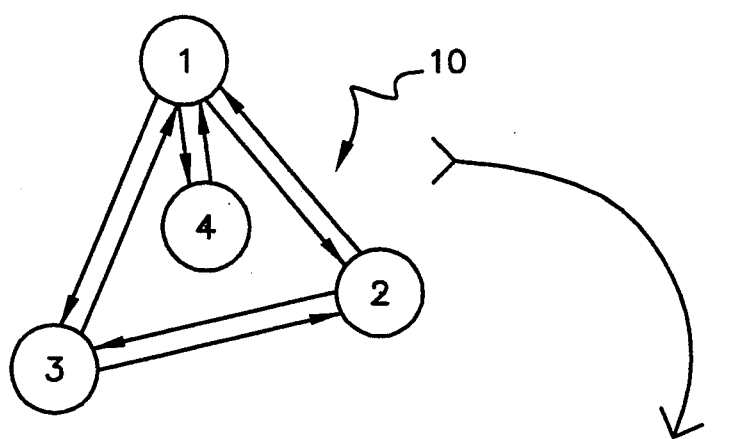
FIG.20c
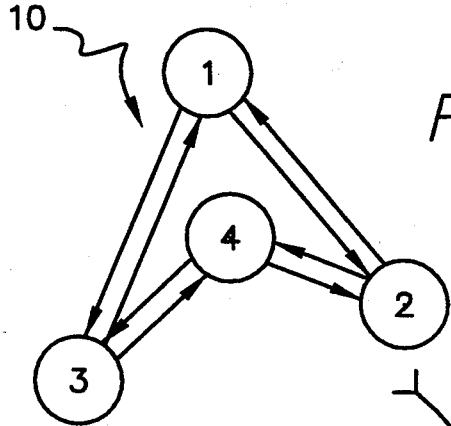
FIG.20d (TO FIG.20i AND FIG.20j)
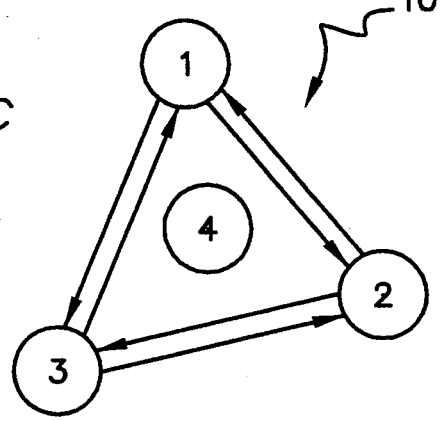
FIG.20e

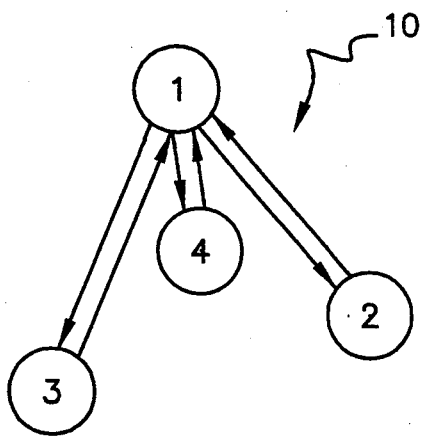
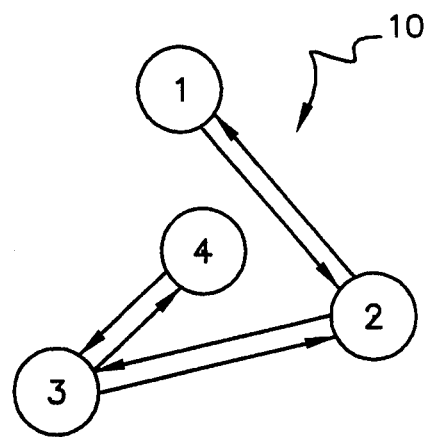
FIG.20f  FIG.20g
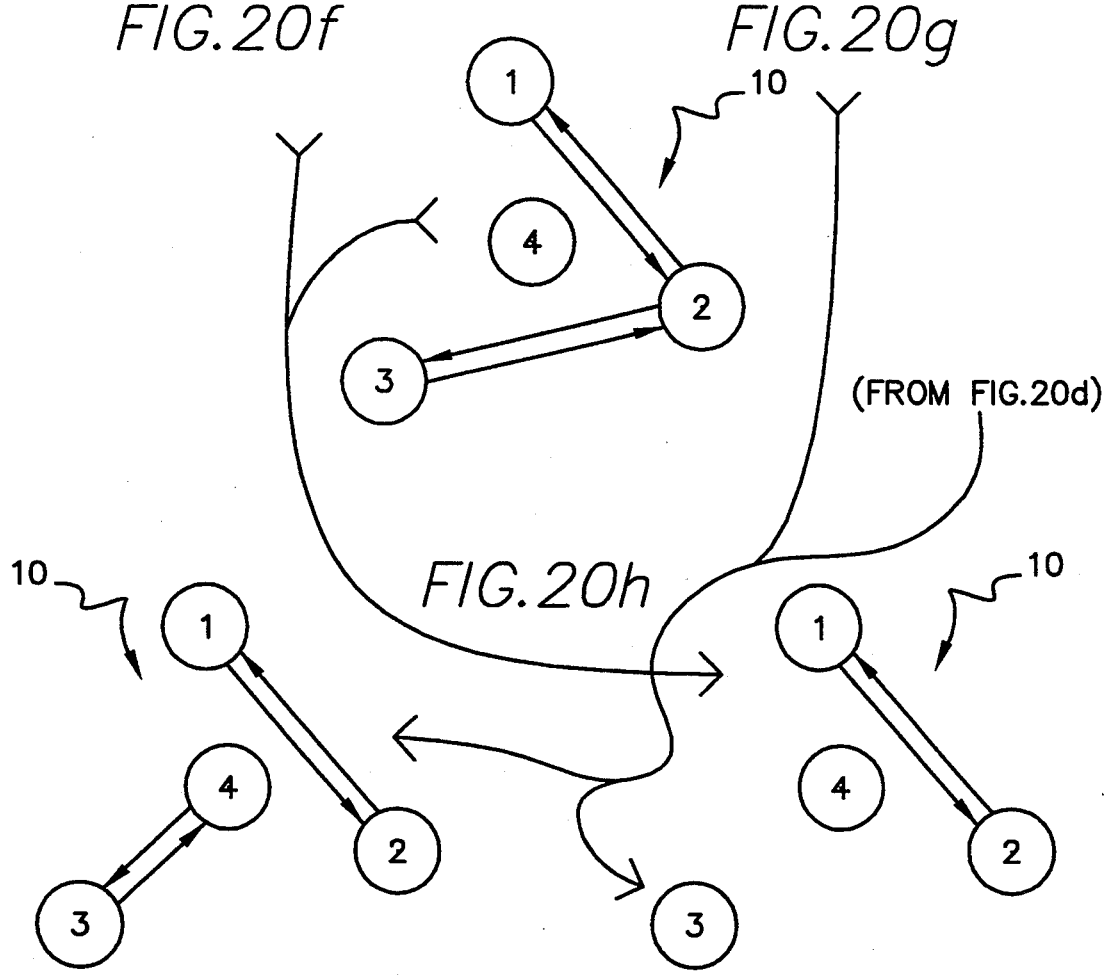
FIG.20i  FIG.20j

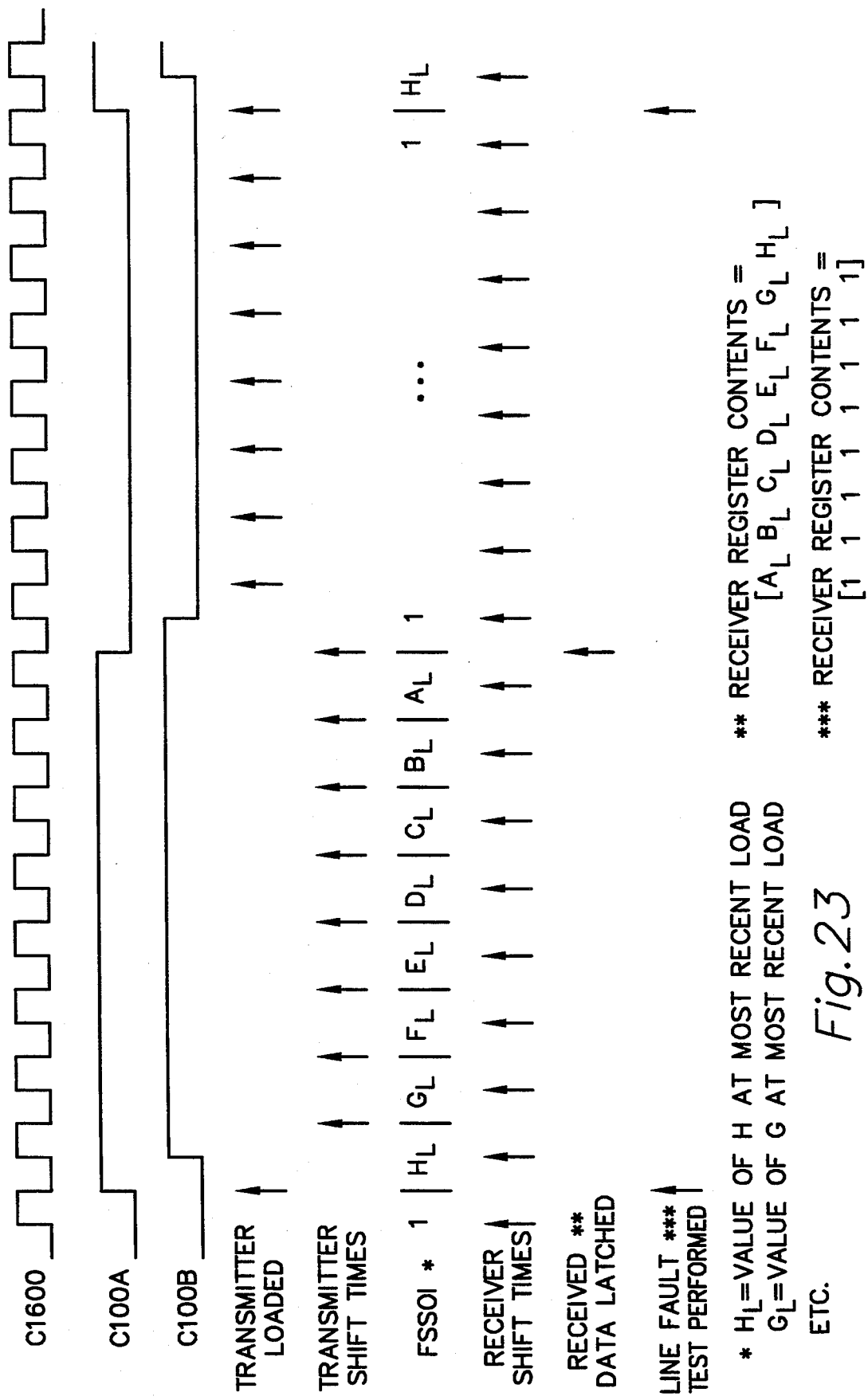

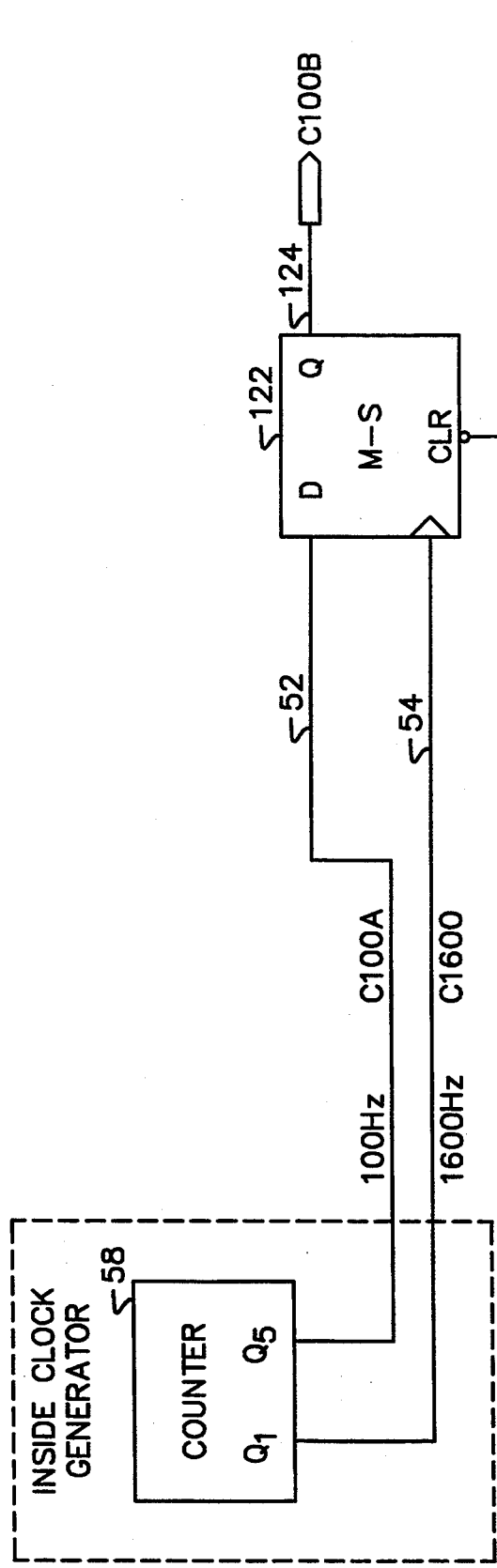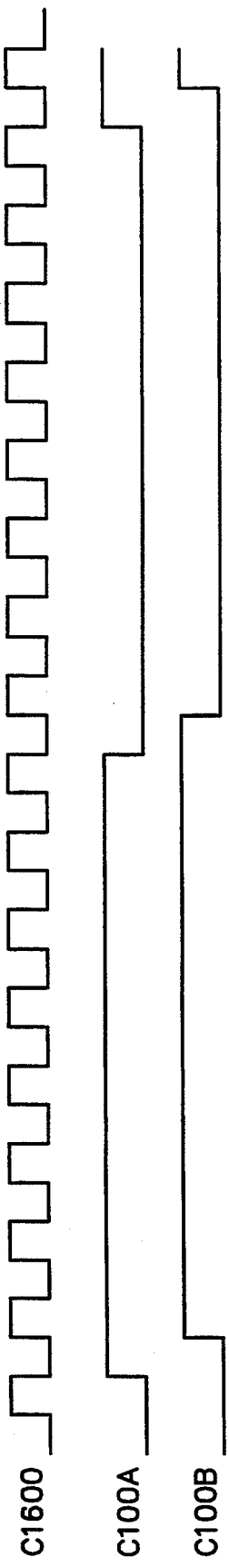
Fig.24a
Fig.24b

Fig. 29

| RELATIVE TO CARD # | CARD NUMBER / RELATIVE NUMBER |
|---|---|
| 1 | 2/1 \| 3/2 \| 4/3 \| 1/4 |
| 2 | 3/1 \| 4/2 \| 1/3 \| 2/4 |
| 3 | 4/1 \| 1/2 \| 2/3 \| 3/4 |
| 4 | 1/1 \| 2/2 \| 3/3 \| 4/4 |

Fig. 30

TRANSMITTING CLOCK CARD NUMBER / RECEIVING CLOCK CARD NUMBER

| 2/1 | 3/1 | 4/1 | 1/1 | 3/2 | 4/2 | 1/2 | 2/2 | 4/3 | 1/3 | 2/3 | 3/3 | 1/4 | 2/4 | 3/4 | 4/4 |

TWO-FAIL-OPERATIONAL FAULT-TOLERANT MULTIPLE CLOCK SYSTEM

FIELD OF INVENTION

The invention pertains to clocks for digital circuits. More particularly, the invention pertains to clocks having fault tolerance.

BACKGROUND OF THE INVENTION

Digital fault tolerance provisions are needed because of the serious consequences of system failure. The common way of achieving such fault tolerance is through redundancy of systems or subsystems such as computers and sensors which must have synchronized time bases. However, it is essential that the synchronization of the time bases be fault tolerant. Also the method or device implementing fault tolerant synchronization should incorporate latent fault detection and reporting so that maintenance and troubleshooting may facilitate the prevention of system failures.

In the case of a parallel set of redundant subsystems, such as computers, it is important that neither strays too far ahead or behind the other in its processing tasks. Although synchronization is required among the systems, such synchronization must be fault tolerant, and must include latent fault detection and reporting. Further the series connections of redundant components (for instance, redundant sensors in series with redundant processors) require synchronization in order to communicate information.

A variety of fault tolerant synchronization schemes exist. Some involve computations which are suitable for synchronizing low frequency clocks whose period is very long relative to the time required for the computations, so that the skew induced by variations in the synchronization mechanism itself is acceptable. Such schemes may be implemented in software; however, such an approach may be incompatible with the architecture of some digital systems wherein computers may be present but dedicated to various tasks. In such situations, the addition of an entire general purpose computer or computers to perform the synchronization task may be very inefficient in comparison to the utilization of dedicated clock circuitry.

There are approaches which provide fault-tolerant clocks with minimal dedicated circuitry. Most of these designs are only one-fail operable, with the exception of one which provides an algorithm (not a circuit) that achieves N-fail operability with 3N+1 clock modules.

No design is known that includes latent fault detection. Without latent fault detection, a fault tolerant clock will continue to operate in the presence of one or more latent faults, but eventually will be vulnerable to failure with a single added fault. That is, the clock eventually is not fault-tolerant any more, and such situation is not detected. This is unacceptable for a fault tolerant clock.

SUMMARY OF THE INVENTION

The present invention is a fault tolerant clock having four identical interconnected clock modules. This so-called quad clock achieves one fail operability with 100% coverage and two fail operability with virtually 100% coverage. The exceptions to the latter coverage include only double failures which occur simultaneously, occur in two separate clock modules, and recognizable as a fault to the unfaulty modules, and are malicious, that is, both faulty modules work to deceive the unfaulty modules. It is the latter double failures which can cause a loss of operation.

The fault tolerant clock also provides partial coverage for three, four, or more faults, that is, numerous communication lines between the modules may fail.

The invention provides fault tolerant simultaneous startup. After power-up, the quad clock appears to the outside world, that is, the rest of the electronics supported by the clock, to start simultaneously. This is accomplished through the passing and voting of (ready) flags between modules. The first clock edge transmitted from the separate modules to the outside world occurs simultaneously. The simultaneous startup is fault tolerant. Faults on the ready lines are masked, and the most likely faults (e.g., failure to signal ready within a reasonable amount of time) are detected and reported. In a worst situation, multiple failures in the startup circuitry can result in the clock not starting.

The present invention incorporates fault tolerant operational diagnostics. It includes latent fault detection, wherein "latent" refers to a fault which does not affect the appropriate behavior of the clock as seen by the outside world. The latent fault detection occurs independently on all four clock modules. A fault flag is set when a given module perceives a signal from another module to be faulty. Operational status of the clock depends on the fault flags. Significant operational status categories are "no faults," "two-fail-operability," "one-fail-operability," "operational," and "not operational". Such category information is needed for maintenance scheduling. There is also an exchange of fault flags between the modules so that the operational status may be assessed. Such exchange of information is in itself fault-tolerant.

Each of the four modules transmits its clock signal to each of the other modules, which involves twelve point-to-point connections. An additional twelve point-to-point connections are needed to accomplish the fault tolerant simultaneous start-up. An additional twelve point-to-point connections are needed to communicate fault flag information. If each module also sends its flags to itself through interconnections, then there are a total of sixteen interconnection lines or point-to-point connections for flag communication. The latter connections enable the modules to be truly identical with one another.

The modules incorporate shift registers which are used to store short time histories of received signals and voted clock outputs, permitting all forms of faults to be detected with minimal added combinational logic. Metastability resolution is automatically accomplished by the first stage of the shift register. Standard loadable counters generate the clock signal having an easily selectable clock duty cycle. The entire clock module circuitry fits easily onto a small integrated circuit or programmable circuit of current technology.

In general, the invention clock design is maximally efficient fulfilling the requirements of two-fail operability/fail-safe operation with fault-tolerant simultaneous start-up and two-fail operability operational status reporting. The invention also has a two frequency options that is, it can output one frequency and a multiple of it, containing within them the synchronization and fault-detection loops. Both lower and higher frequency signals are fault tolerant.

BRIEF DESCRIPTION OF THE DRAWINGS

FIG. 12 is a diagram of the fault tolerant reset interconnection topology of a two-failure-operable configuration of the clock system.

FIG. 13 is a diagram of the topology of a one-failure-operable configuration.

FIG. 14 is a topology diagram of an operable configuration.

FIG. 16a is a topology diagram of a transient configuration.

FIG. 16b is a topology diagram of a stable configuration.

FIGS. 17a–f are topology diagrams having mono-directional links.

FIGS. 20(a–j) show topology diagrams of ten bi-directional clock configurations and their stability.

FIG. 23 is a fault flag communication timing diagram.

FIGS. 24a–b are block and timing diagrams of the fault flag communication clock phase.

FIG. 29 is a table listing of cards and their respective correspondence between the absolute and relative numbers.

FIG. 30 is a table of the fault flag ordering common to all clocks.

DESCRIPTION OF THE PREFERRED EMBODIMENT

The present invention is a digital clock circuit designed to tolerate all non-simultaneous double failures. The circuit delivers four fault-tolerant 100 hertz clocks synchronized to within 200 nanoseconds of one another with a maximum frequency error of 140 parts per million, four fault-tolerant 1600 hertz clocks synchronized to within 1200 nanoseconds of one another with a maximum frequency error of 140 parts per million, and 32 fault flags to be used to monitor the condition of the circuit and facilitate maintenance diagnostics.

Figure 1A:
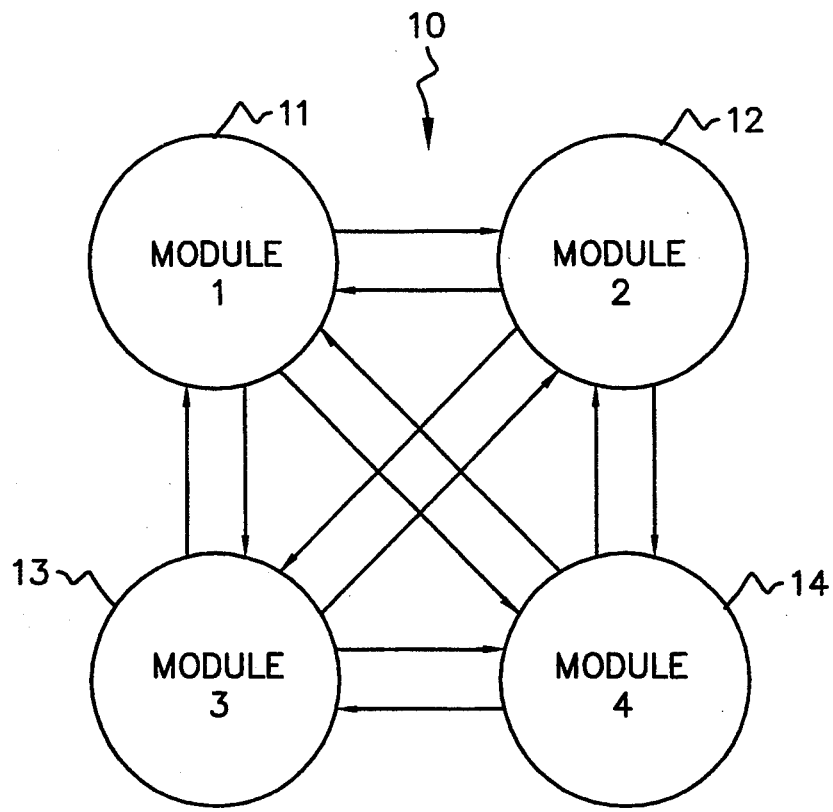
FIGS. 1a–b show the interconnection of four clock modules of the invention and a block diagram of a clock module, respectively.
Figure 3:
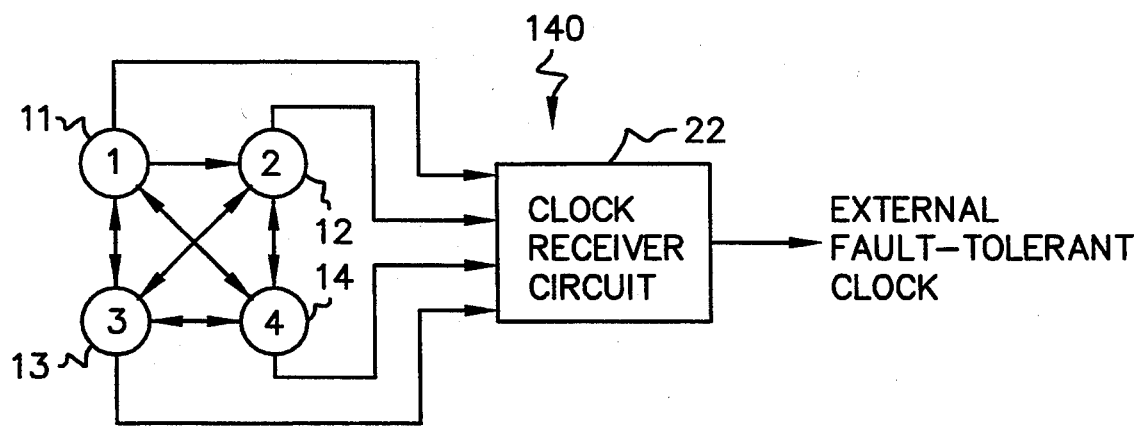
FIG. 3 shows the four clock modules and their connection to an optional and separate fault containment region receiver.
Figure 1B:
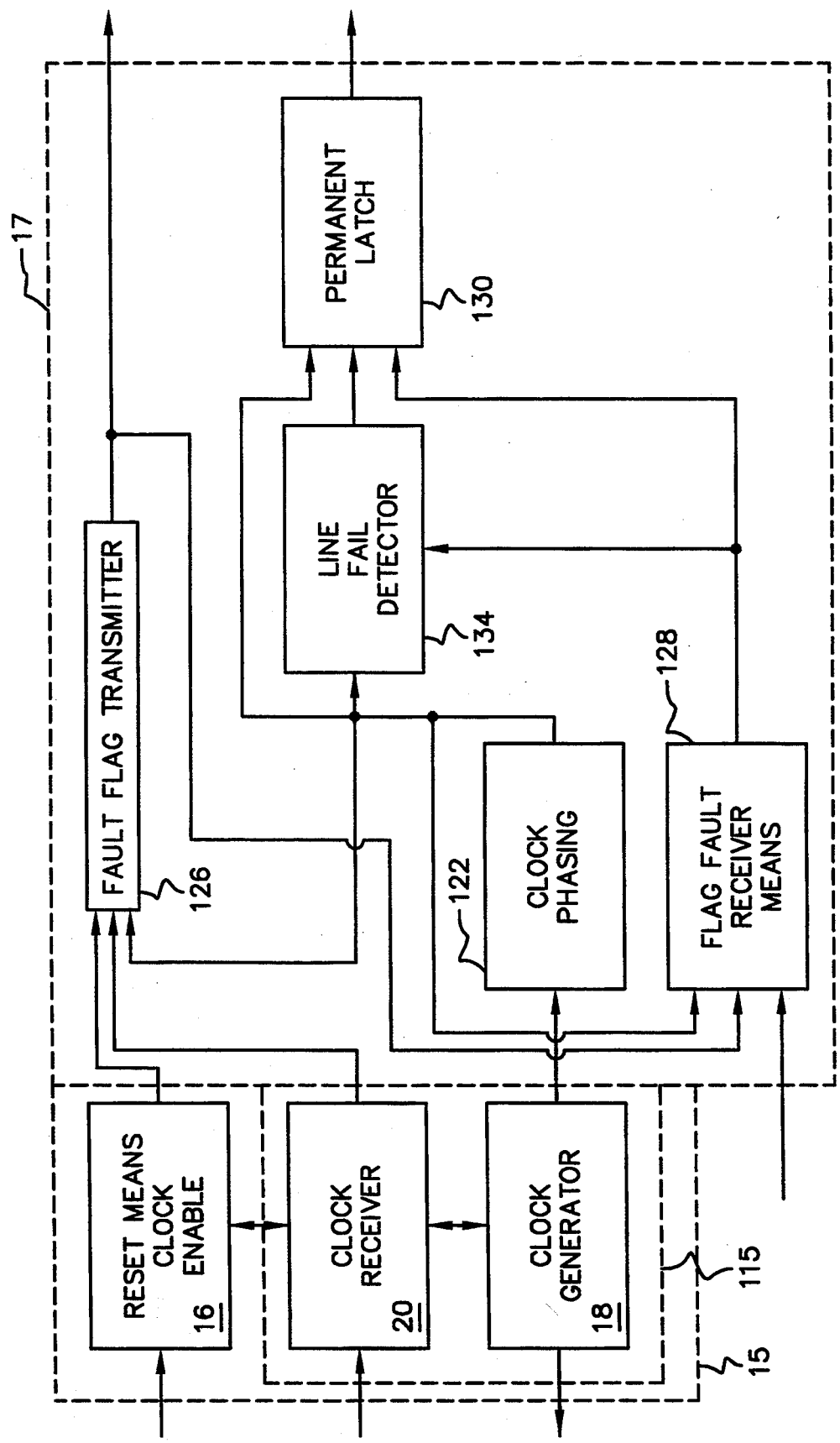
Figure 2:
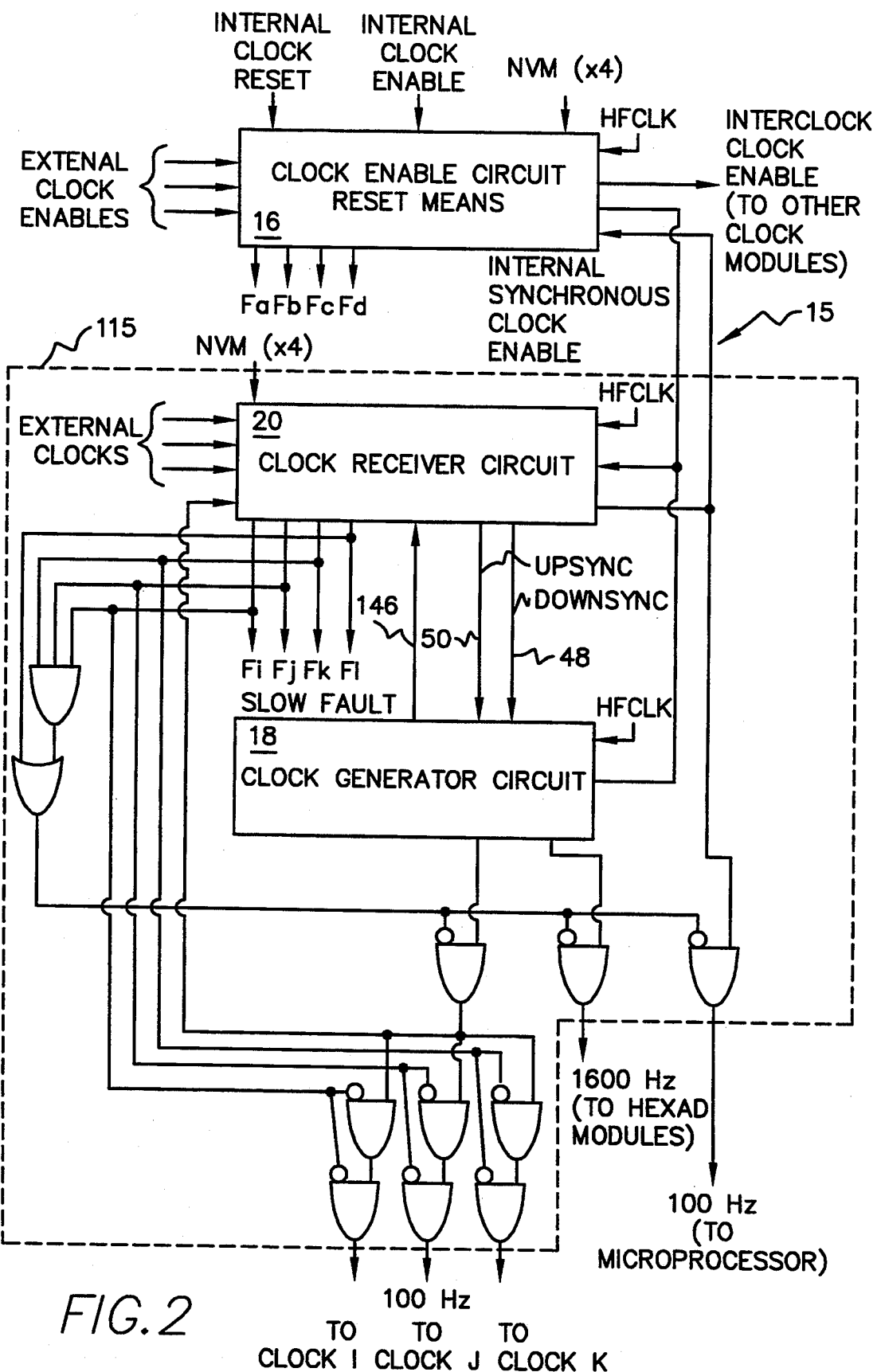
FIG. 2 is a detailed block diagram of part of a clock module.
Figure 22:
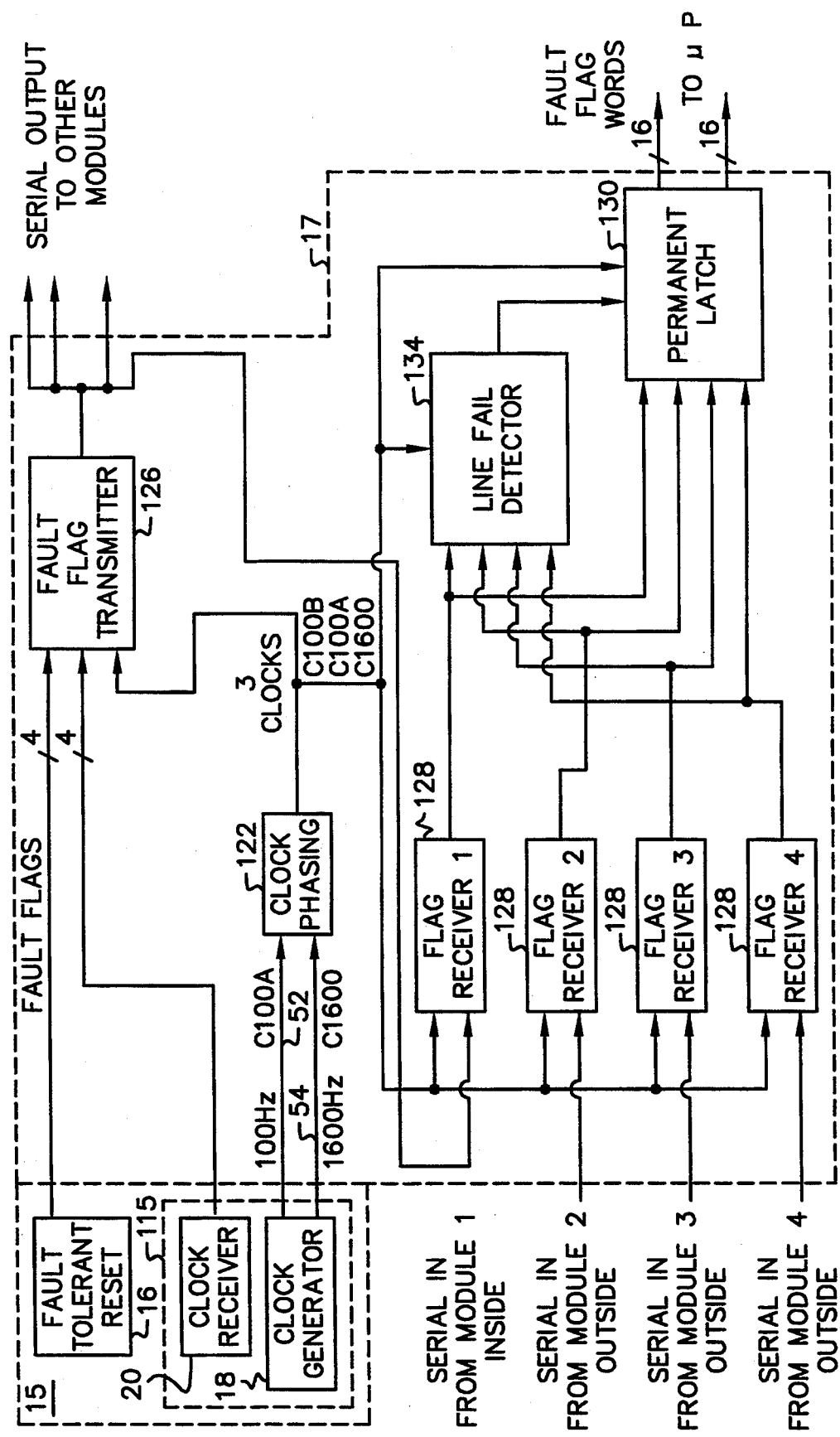
FIG. 22 is a functional block diagram of the fault flag communication system.

FIG. 1a reveals clock 10 having four modules 11, 12, 13 and 14 and the interconnections among these modules. FIG. 1b is a block diagram of a module 11, 12, 13 or 14. Each module contains reset means 16, clock unit 115 having clock receiver 20 and clock generator 18, and operational diagnostics 17. FIG. 2 reveals partial module 15 of each module 11, 12, 13 or 14. Each module also contains a fault flag communication circuit 17 as shown in FIG. 22. Four major parts of a module are reset means or fault tolerant reset or clock enable circuit 16 which provides an initial, synchronized enable to all the other clock modules; clock generator circuit 18 which generates the 100 hertz and 1600 hertz outputs; clock receiver circuit 20 which monitors the other three clock modules with input clocks from other modules and provides synchronization commands to clock generator 18; and an operational diagnostic means 17. Also, clock receiver 20 outputs fault-tolerant clock and maintenance flags $F_I$, $F_J$, $F_K$, $F_L$. FIG. 3 reveals an optional layout 140 having the clock modules 11, 12, 13 and 14 outputting four fault-tolerant clocks, respectively, to a clock receiver circuit 22. Clock receiver 22 is similar to receiver 20 in the clock module, except for having a minor combinational logic 64 change, wherein gate 138 is removed for constructing receiver 22. Receiver 22 outputs one external fault-tolerant clock signal in optional configuration 140.

Figure 4:
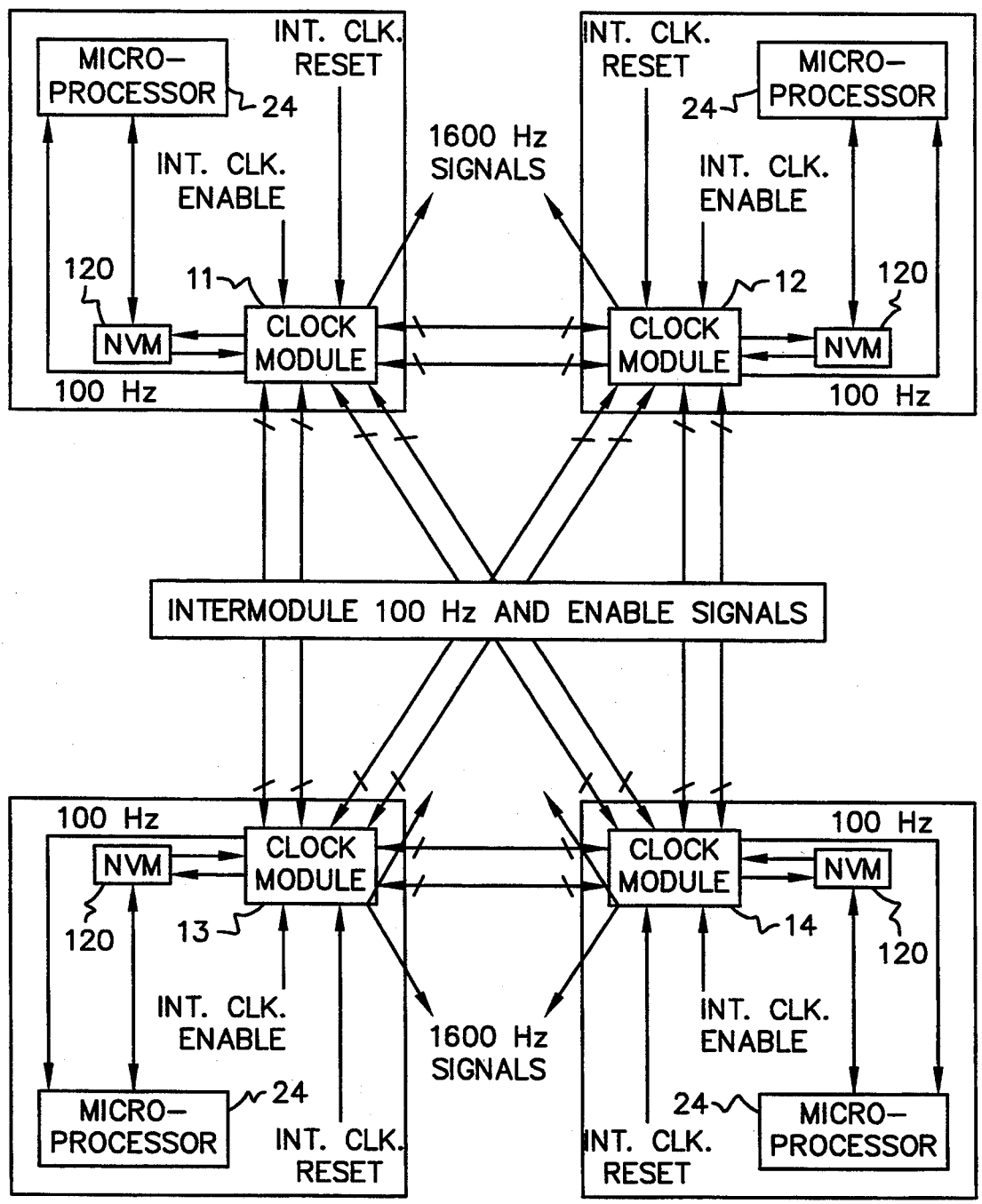
FIG. 4 is a block diagram of the system incorporating the clock modules, microprocessors and nonvolatile memories.

FIG. 4 is an elaboration of FIG. 1 showing the four clock modules indicating their interconnections and external connections with greater detail and interconnection with memories 120 and processors 24 for application to an external system using the clock signals. Among four identical modules, there are twelve point-to-point wire tetrahedron clock interconnection architecture, twelve point-to-point wire tetrahedron fault tolerant reset interconnection architecture, and twelve point-to-point wire operational status interconnection architecture or sixteen point-to-point wire operational status interconnection architecture. The fault tolerant clock circuit is designed to eliminate all potential faults due to metastable states. Setup and hold times are satisfied for the various digital components within the circuit. Shift registers are utilized to record the recent history of the clock thereby permitting fault-detection and signal synchronization.

The synchronization requirements are less than 1000 nanosecond skew error between any pair of clock modules' 100 hertz signals, "tight synchronization" between any pair of clock modules' 1600 hertz signals, and less than 200 parts per million frequency error, for one particular application, namely the Air Data Inertial Reference Unit (ADIRU).

Each clock generator circuit 18 outputs the module's 100 hertz and 1600 hertz synchronous clocks. The 100 hertz signals are confined to the fault tolerant clock circuit itself. The 1600 hertz signals are delivered to HEXAD units. Also, each clock receiver circuit 20 outputs the module's 100 hertz reference clock. The reference clocks are delivered to microprocessors 24. A HEXAD unit is a six sensor unit wherein the sensors are gyroscopes and/or accelerometers, such that two of the six sensors can fail and the unit remains adequately functional.

Clock generator 18 has a loadable counter 56 with a load valve selected to control frequency and duty cycle. The two stage counter 56, 58 provides 1600 Hz and 100 Hz synchronized clocks. New features include synchronization on the rising and falling edges of the 100 Hz clock and a 50 percent duty cycle on the 1600 Hz and 100 Hz clock outputs. Also, in clock generator 18 is slow fault detection combinational logic 116.

The following formulas are used to calculate the worst case skew and frequency errors possible under proper operation.

$$\text{Skew (Generator outputs)}_{max} = 2AT_S + 2T_{HFCLK},$$

$$\text{Skew (Receiver output)}_{max} = 2T_{HFCLK},$$

$$\Delta(\text{freq})_{max} = A + 2(T_{HFCLK}/T_S),$$

where
$A$ = the accuracy of the high frequency crystal oscillator,
$T_S$ = the synchronization period (elapsed nominal time between synchronized edges),
$T_{HFCLK}$ = the period of the high frequency crystal oscillator.

Note that the formulas indicate that the skew between the outputs of receivers 20 is less than the skew between of the outputs of generators 18. Because receivers 20 drive microprocessors 24, the skew between the receivers' 100 hertz signals should be used to judge clock performance. However, the value of the skew between the generators' 1600 hertz outputs is critical since it is used to test for circuit faults. By including a slightly modified clock receiver circuit 22 on each HEXAD, the skew between the 1600 hertz signals delivered to the HEXAD may be reduced from the skew of equation 1 to that of equation 2 above. An oscillator with 100 parts per million accuracy is utilized for clock generator circuit 18. Equations 1, 2 and 3 above, show that the smaller $T_{HFCLK}$ results in better clock performance. Ten megahertz results in a relatively small value of $T_{HFCLK}$ (e.g., 100 nanoseconds) and yet leaves ample time for the digital components to resolve their timing issues. Synchronizing on both edges of the 100 hertz clock signal ($T_S = 5$ milliseconds) provides a significant reduction in skew, relative to synchronizing on only one edge ($T_S = 10$ milliseconds) of the 100 hertz clock signal. The accuracy of the frequency is related to the accuracy of the crystal oscillator.

With the parameters given ($A = 100 \times 10^{-6}$, $T_{HFCLK} = 100 \times 10^{-9}$, $T_S = 5 \times 10^{-3}$), the above three equations respectively result in the following:

$$\text{Skew (Generator)}_{max} = 1200 \text{ nsec}$$

$$\text{Skew (Receiver)}_{max} = 200 \text{ nsec}$$

$$\Delta(\text{freq})_{max} = 140 \text{ ppm}.$$

Figure 5:
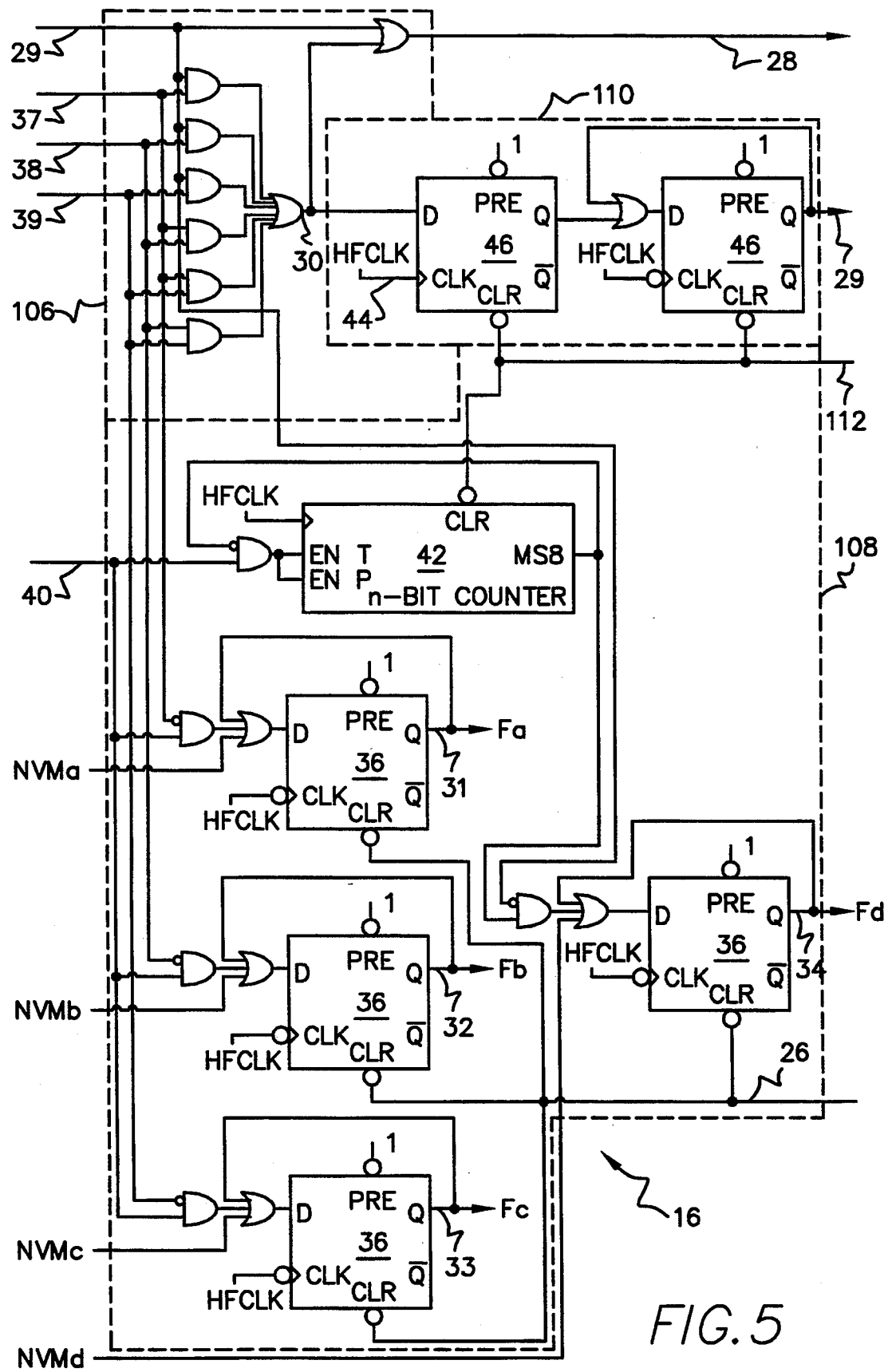
FIG. 5 is a schematic of the clock enable circuit of the clock module.

Reset means or clock enable circuit 16 of FIG. 5 provides an initial, synchronized enable signal to all clock modules, ensuring that the four modules are synchronized to one another when the clock is started, continuously detects, latches and reports latent faults within clock enable circuit 16 itself, and provides metastability resolution. Circuit or fault tolerant reset 16 has a 2/4 voter mechanism to provide a two-fail-operational initialization, fault detection logic that detects a hardware failure in reset circuit 16 and latches fault flags, and a master-slave flip-flop combination that provides metastability resolution at circuit initialization. The reset means or clock enable circuit 16 consists of combinational logic 106, fault detection reset 108 and reset latch 110. Clock enable circuit 16 meets multiple timing requirements at power-up which include that after initial power-up, the clock should not operate until all microprocessors 24 that it drives have been fully initialized, and that all clock modules be synchronized initially.

When operation begins, power is delivered to the four clock-processor boards at T=0. At this time, the signal' internal clock reset 26 is asserted within each corresponding clock module 11, 12, 13 and 14. Signal 26 is asserted throughout microprocessor 24 initialization to ensure that the fault-tolerant clock is held inoperable. Due to random factors, microprocessors 24 will not complete initialization simultaneously. Thus, a minimum time of completion $T_A$ and a maximum time of completion $T_B$ is specified. The four internal clock resets 26 need to be and are asserted until at least time $T_B$. It is possible that a diagnostics routine might require the capability of the system to load the fault latches with unresolved faults from previous sessions. If so, the clock enable fault latches are loaded by data stored in non-volatile memory when internal clock reset 26 is suppressed.

Each of clock modules 11, 12, 13 and 14 utilizes an internal clock enable signal 28 which is asserted after microprocessor 24 initialization. Signal 28 is asserted well after $T_B$ (wherein a minimal intervening period of time is $T_B - T_A$), to ensure that clock modules 11, 12, 13 and 14 have been released from internal clock reset 26. Due to random factors, the four internal clock enable signals 28 are asserted between times $T_C$ and $T_D$.

Clock enable circuit 16 is designed to mask faults within its circuitry. Faults are masked by the 2/4 voter which asserts a verified clock enable signal 30 from combinational logic 106 upon receipt of second clock enable signal. Thus, if one of clock modules 11, 12, 13 or 14 receives its internal clock enable signal 29 (the power up ready signal) grossly early, the fault does not propagate into any of the modules' verified clock enable signals 30. Likewise, if two of clock modules 11, 12, 13 and 14, never assert their internal clock enables 29, all four clocks can still generate their verified clock enables 30.

Latent faults within enable circuit 16 are detected and reported by sixteen fault flags indicated by outputs 31, 32, 33 and 34 of shift registers 36. These 16 fault flags are included to merely facilitate maintenance; they do not affect the operation of the clock. Each module has four fault flags 31, 32, 33 and 34, corresponding to clock enable signals 37, 38 and 39 from external clocks and signal 29 from the internal clock. A fault flag is asserted if verified clock signal 40 from receiver 20 is asserted before corresponding clock enable signal 29, 37, 38 or 39. All detected faults are latched to prevent transient fault-reporting.

Clock enable circuit 16 is not too quick to judge an internal enable signal 29 as the circuit is inherently asynchronous. Time is allowed to elapse before concluding that internal clock enable signal 29 is faulty. Fault signal 34 which corresponds to internal clock enable signal 29, is disabled initially by delaying verified clock signal 40 through an N-bit digital counter 42. For a sufficient delay by counter 42, the minimum number of bits N is given by the following equation:

$$n = [log_2((T_D - T_C)/T_{HFCLK})]$$

where $T_C$ = minimum time for assertion of internal clock enable, $T_D$ = maximum time for assertion of internal clock enable, $T_{HFCLK}$ = period of the high frequency oscillator signal HFCLK. When a clock module 11, 12, 13 or 14, receives at least two or more clock enable signals 29, 37, 38 or 39, then verified clock enable signal 30 is asserted. Verified clock enable signal 30 is latched and synchronized to a local HFCLK signal 44 by two D flip-flops 46. Internal synchronous clock enable signal 29 is asserted on the following edge of HFCLK signal 44. Since all synchronous devices within a clock module 11, 12, 13 or 14, are positive-edge triggered, metastability is resolved. Flip-flops 46 and counter 42 have an internal clock reset 112 which is an "early" power up reset.

Figure 6:
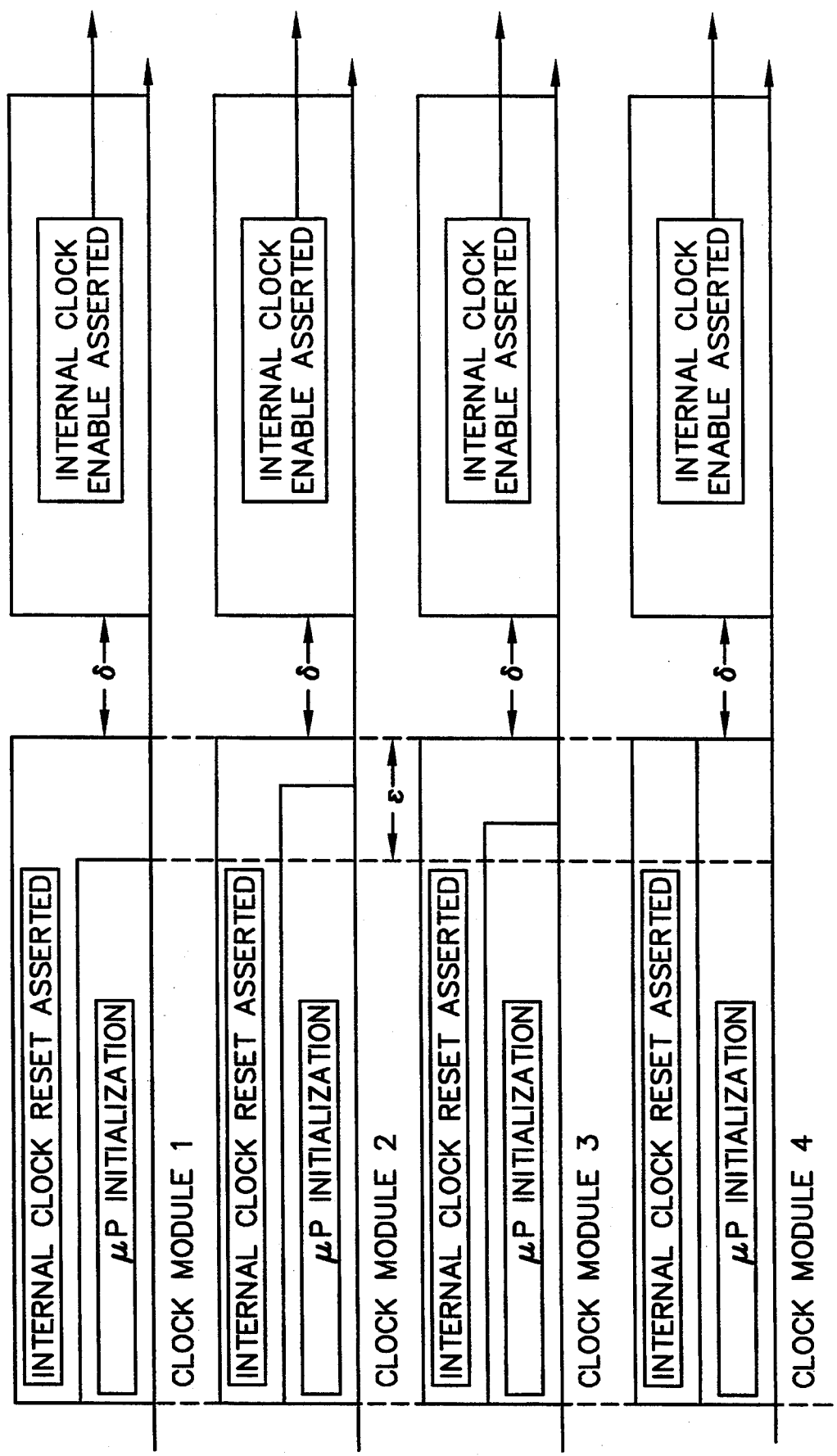
FIG. 6 is an after power-up initial timing sequence diagram.

FIG. 6 reveals the clock enable circuit 16 sequence for initial timing after power-up. For each module 11, 12, 13 or 14, microprocessor 24 is initialized at least ε period of time prior to the assertion of the respective internal clock reset. The respective microprocessor 24 initializations may be completed at various times within an ε period of time. After all microprocessors 24 are initialized or at the time the last microprocessor is initialized, then the internal clock reset may be asserted. For each module 11, 12, 13 and 14, the internal clock enable is asserted δ time after the internal clock enable is asserted. δ time is greater than ε time.

Figure 7:
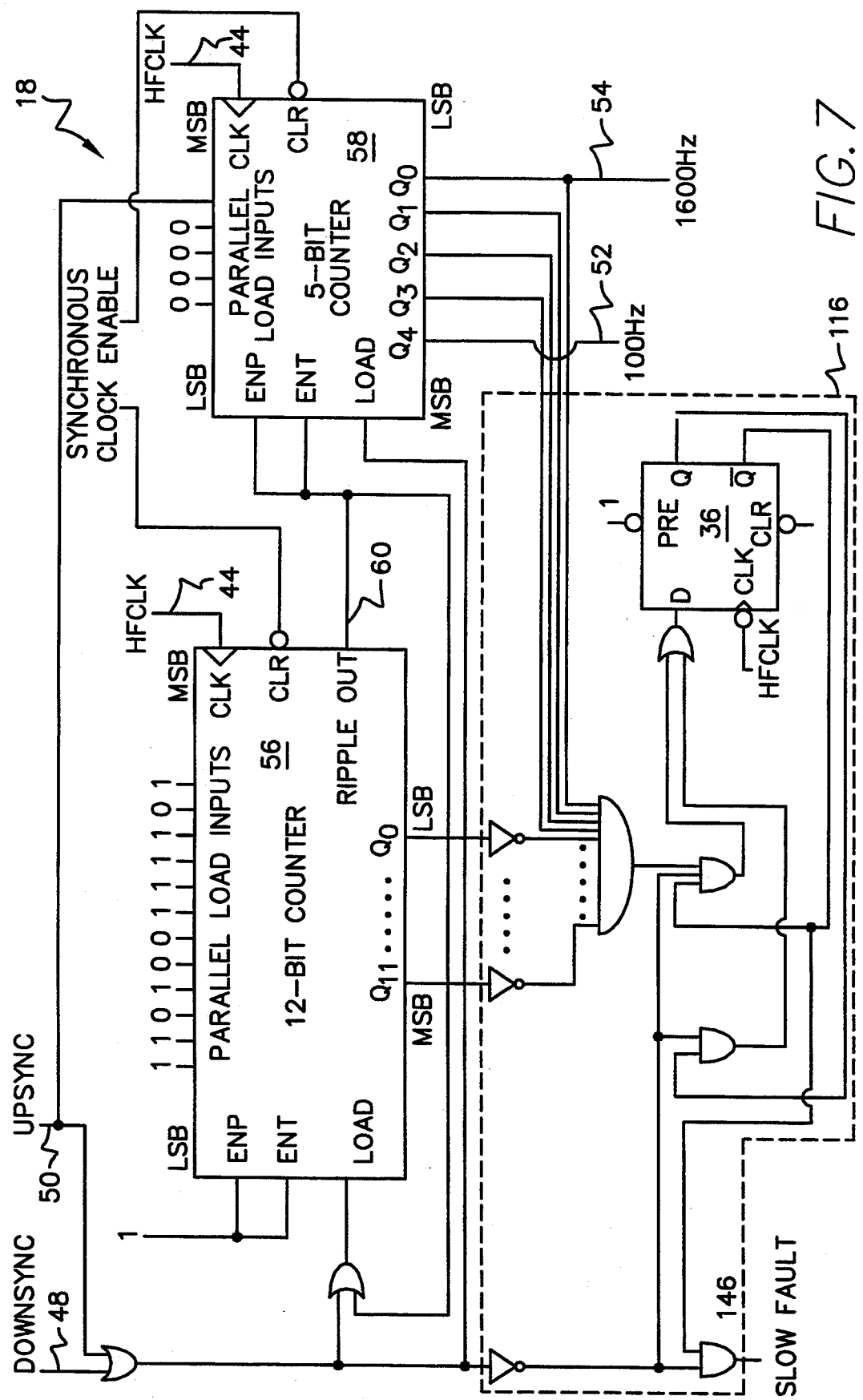
FIG. 7 is a schematic diagram of the clock generator circuit of the clock module.

The purpose of clock generator circuit 18 is to follow synchronization command signals 48 and 50 that it receives from clock receiver circuit 20. In absence of command signals 48 and 50, generator circuit 18 acts as a freely running oscillator. FIG. 7 reveals the details of clock generator circuit 18. Outputs of generator circuit 18 include a fault tolerant 100 hertz signal which is tightly synchronized to the 100 hertz generator outputs 52 of the other three clock modules, and a fault tolerant 1600 hertz signal 54 which is tightly synchronized to the 1600 hertz generator outputs 54 of the other three clock modules.

Figure 8:
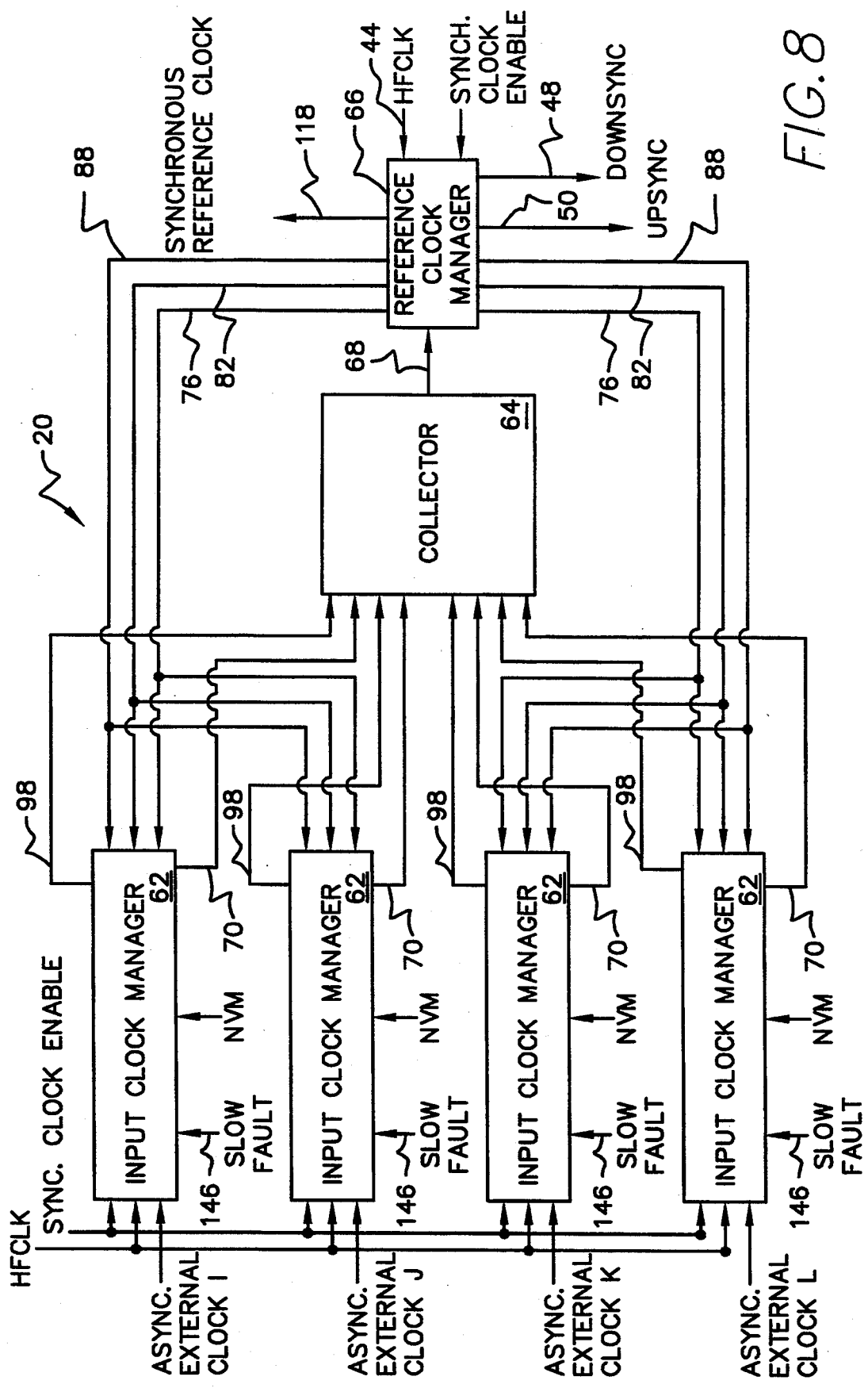
FIG. 8 is a schematic diagram of the clock receiver circuit of the clock module.

A need for dual 100 hertz and 1600 hertz clock signals, each having a 50% duty cycle, is provided by a divide-by-N stage which is implemented with a tandem counter design. A second counter 58 functions as a divide-by-32 stage, providing both 100 hertz and 1600 hertz signals. The period of the least significant bit of second counter 58 is one-sixteenth the value of the period of the most significant bit. Although the most significant bit of first counter 56 does not have a fifty percent duty cycle, the five bits of second counter 58 essentially do. First counter 56 supplies second counter 58 with a 3200 hertz signal. The 3200 hertz is obtained by dividing the 10 megahertz crystal oscillator HFCLK output 44 by 3125. First counter 56 is wired as a divide-by-3125 stage. When clock receiver circuit 20 obtains a positive reference edge, it asserts UPSYNC signal 50 for one cycle of the high frequency crystal oscillator (HFCLK) signal 44. On the line of signal 50, a one or zero is loaded for a 100 Hz clock value when it is synchronized depending whether it is on the rising (up) edge or falling (down) edge, respectfully, to set the clock for the next one-half period. First counter 56 is loaded to $001111001011_2$ ($4096_{10} - 3125_{10}$), while second counter 58 has its most significant bits set to logic one. As time proceeds, first counter 56 provides a nominal 3200 hertz signal 60 to second counter 58. If clock receiver circuit 20 obtains a negative reference edge within the next 5 milliseconds, then it will assert DOWNSYNC signal 48 for one cycle of HFCLK signal 44. First counter 56 is then loaded to $001111001011_2$; second counter 58 has all of its bits set to logic 0. If clock receiver 20 fails to obtain a negative reference edge within the next 5 milliseconds, the second stage of the counter will simply "roll over," independent of the reference signal; the value of all its bits will be set to logic 0. FIG. 8 is a schematic of clock receiver circuit 20. Clock receiver circuit 20 detects faults within the fault tolerant clock circuit, reports detected faults to an external system (i.e., a non-volatile memory), uses the knowledge of circuit faults to extract a properly defined reference signal, and provides synchronization command signals 48 and 50 to generator circuit 18. Synchronization command signals 48 and 50 are computed in accordance with a reference signal. A slightly modified version of clock receiver circuit 20 is located on each HEXAD unit. Receiver 20 reduces skew between the 1600 hertz synchronous clocks.

Clock receiver 20 has a new five shift register architecture for saving recent history of received clocks and verified clocks. Input clock manager 62 has new combinational logic to generate fault flags, fault flag latch means and a non-volatile memory interface. Collector combinational logic 64 votes input clocks based on fault flags. A new reference clock manager 66 has combinational logic for producing sync signals 48 and 50, and combinational logic for producing check signals 82 and 88.

Figure 9:
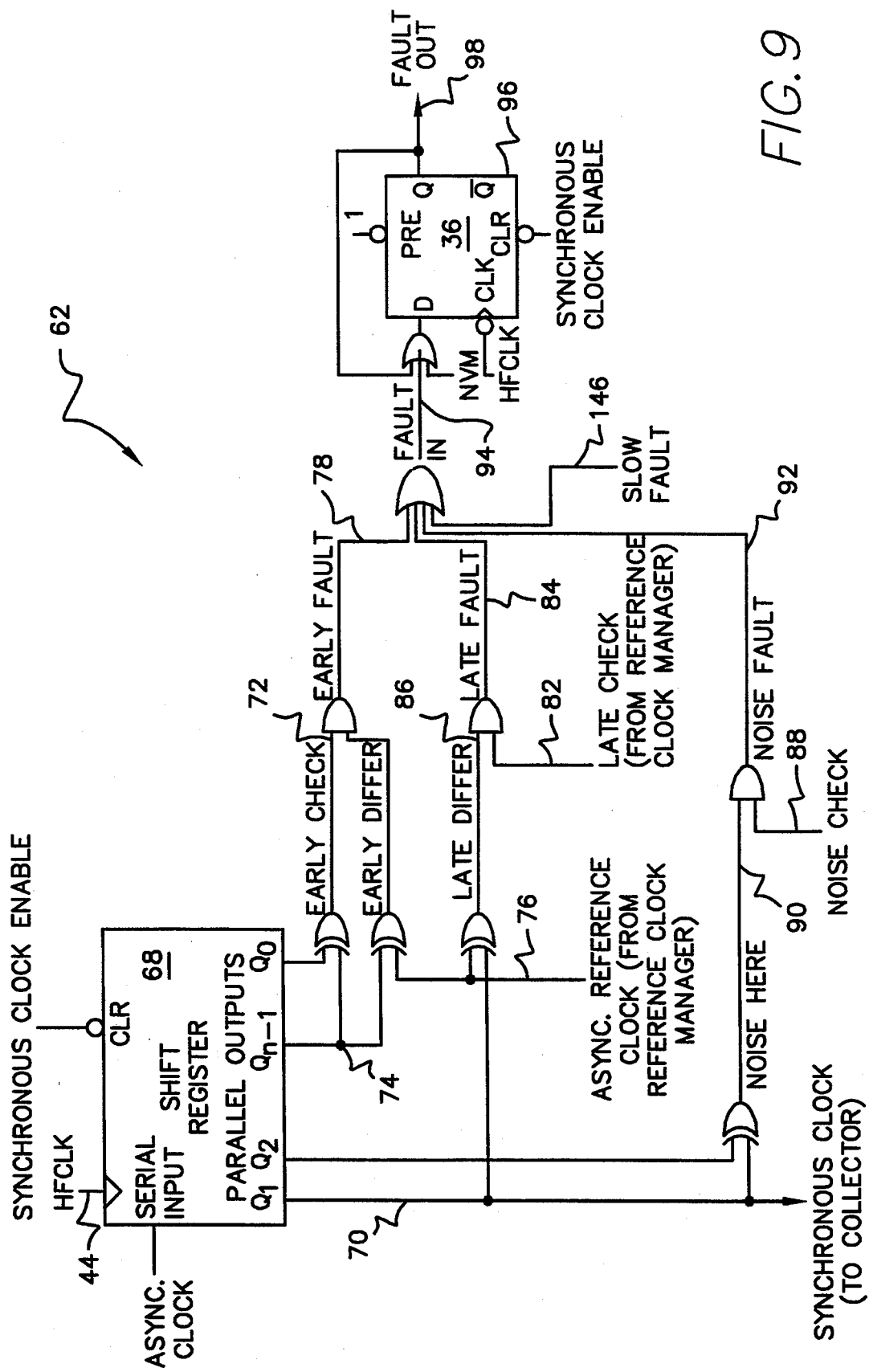
FIG. 9 is a schematic of the input clock manager circuit of the clock receiver circuit.

Clock receiver circuit 20 has three major subcircuits. First, there are four input clock managers 62 to synchronize the three intermodule and one internal 100 hertz clock signals. Manager 62 also detects and reports faults. A collector 64 performs a median voter algorithm. Reference clock manager 66 removes glitches from candidate reference clock 68 of collector 64. Manager 66 also assists with fault detection and delivers synchronization command signals 48 and 50 to clock generator circuit 18. Input clock manager 62 synchronizes the incoming external clock modules' 100 hertz clocks to the local high frequency time base HFCLK 44. Input clock manager 62 also detects and reports faults on each of the incoming 100 hertz signals. Even though the internal 100 hertz signal is already synchronized, fault detection and notification is performed on that signal. FIG. 9 is a schematic of input clock manager 66. Input synchronization is provided by shift register 68. The first output bit of shift register 68 is synchronized input signal 70 which is sent to collector 64 to be included in the median voter algorithm.

The following is an explanation of fault detection and notification circuitry. One possible problem is detection of a grossly early edge. For instance, consider the currents of a level transition on one of the clock signals present at the input to input clock manager 62. After (n−1) cycles of HFCLK 44 elapse, signal early check 72 is asserted for one period of HFCLK 44. Simultaneously, output 74 of the (n−1)th bit of shift register 68 is compared with asynchronous reference clock 76 from reference clock manager 66. If the two signals 74 and 76 disagree or differ, then early fault signal 78 is asserted. Early fault signal 78 is based on the fact that no individual clock signal should precede reference clock 76 by too great amount of time.

The amount of time that elapses between receiving a clock edge and checking whether that clock edge is early depends on the value of n, that is, the number of bits in the input clock manager 62. Since an early clock edge could belong to a clock module 11, 12, 13 or 14, having a crystal oscillator running slightly fast, the value of n should be chosen large enough to tolerate an acceptable skew due to fluctuations in the oscillator's frequency. Recalling a formula above for tolerable skew between clock generator signals, n should have the value as noted in the following formula.

$$n = (2AT_S + 2T_{HFCLK})/T_{HFCLK}$$

where
- $A$ = the accuracy of the high frequency crystal oscillator,
- $T_S$ = the synchronization period (elapsed nominal time between synchronized edges),
- $T_{HFCLK}$ = the period of the high frequency crystal oscillator.

It may be noted that because the four clock modules 11, 12, 13 and 14 are synchronous with respect to each other, it is possible for clock J of module 12 to detect the synchronous clock transition of clock I of module 11 almost immediately. However, clock I must wait one full cycle of HFCLK 44 to observe its own clock transition. To avoid this delay, input clock manager 62 corresponding to the internal clock signal may have one less bit in its shift register 68.

Input clock manager 62 has circuitry for detection of the grossly late edge of an individual clock relative to the reference clock. In other words, a level transition on an input to clock module 11, 12, 13 or 14, is considered grossly late if an unacceptable amount of time elapses between the level of transition on the input and the corresponding level transition on the reference signal of that module. None of a module's input clocks should lag its reference clock by too great amount of time.

For instance, consider the situation of no clock faults. If a clock module detects a reference edge, that means at least two of the other clock modules have recently transitioned. The clock module that detects the reference edge then transitions its own synchronous signal. By this time, at least three of the four modules have transitioned. The fourth clock will then transition after a voter delay consisting of at most two cycles of its own HFCLK 44. Within one cycle of its own HFCLK 44, the other three modules will see the transition of the fourth module. The total time elapsed is 3 cycles of HFCLK 44. Thus, once a clock module observes a reference edge, it should observe all remaining transitions within the next three cycles of HFCLK 44. However, since the four modules 11, 12, 13 and 14 have different HFCLK's 44, additional tolerance must be provided by the late fault detection circuit.

When a reference clock edge is detected, late check signal 82 is provided by reference clock manager 66 several cycles after an edge occurs on a reference clock. Late check signal 82 is produced in a similar manner as early check signal 72. If there is a difference between synchronized input signal 70 and reference signal 76, a late differ signal 86 will be asserted. If the two signals 70 and 76 differ when late check signal 82 is asserted, late fault signal 84 will simultaneously be set.

One of the faults detected by the clock circuit is noise on an intermodular 100 hertz signal. In most cases, noise is automatically masked, and detected by circuitry 62 which detects grossly early edges. However, in a specific case where one edge has arrived the second input may be simultaneously corrupted by the noise. If a third edge has not arrived, the reference clock will follow the noisy signal and become corrupted itself. Corruption of the reference clock is entirely unacceptable, since it synchronizes clock generator circuit 18 and is delivered to microprocessor 24.

Thus, reference clock manager 62 has circuitry which prevents the reference clock from becoming corrupted by such noise. Additionally, reference clock manager 66 also instantly asserts a noise check signal 88 when it detects an attempt to corrupt the reference clock signal. The noisy input will concurrently assert a noise here signal 90 within its input clock manager 62. The simultaneous presence of noise here signal 90 and noise check signal 88 will assert a noise fault signal 92 within appropriate input clock manager 62.

If an early fault signal 78, late fault signal 84, or noise fault 92 exists, then the fault in signal is asserted at fault latch 96. Fault latch 96 is a D flip-flop which feeds its output back into the input, latching logic ones for the entire power-up session. Additionally, unresolved faults from previous sessions can be loaded into latch 96 at power-up. Such unresolved faults would be stored in a non-volatile memory.

Figure 10:
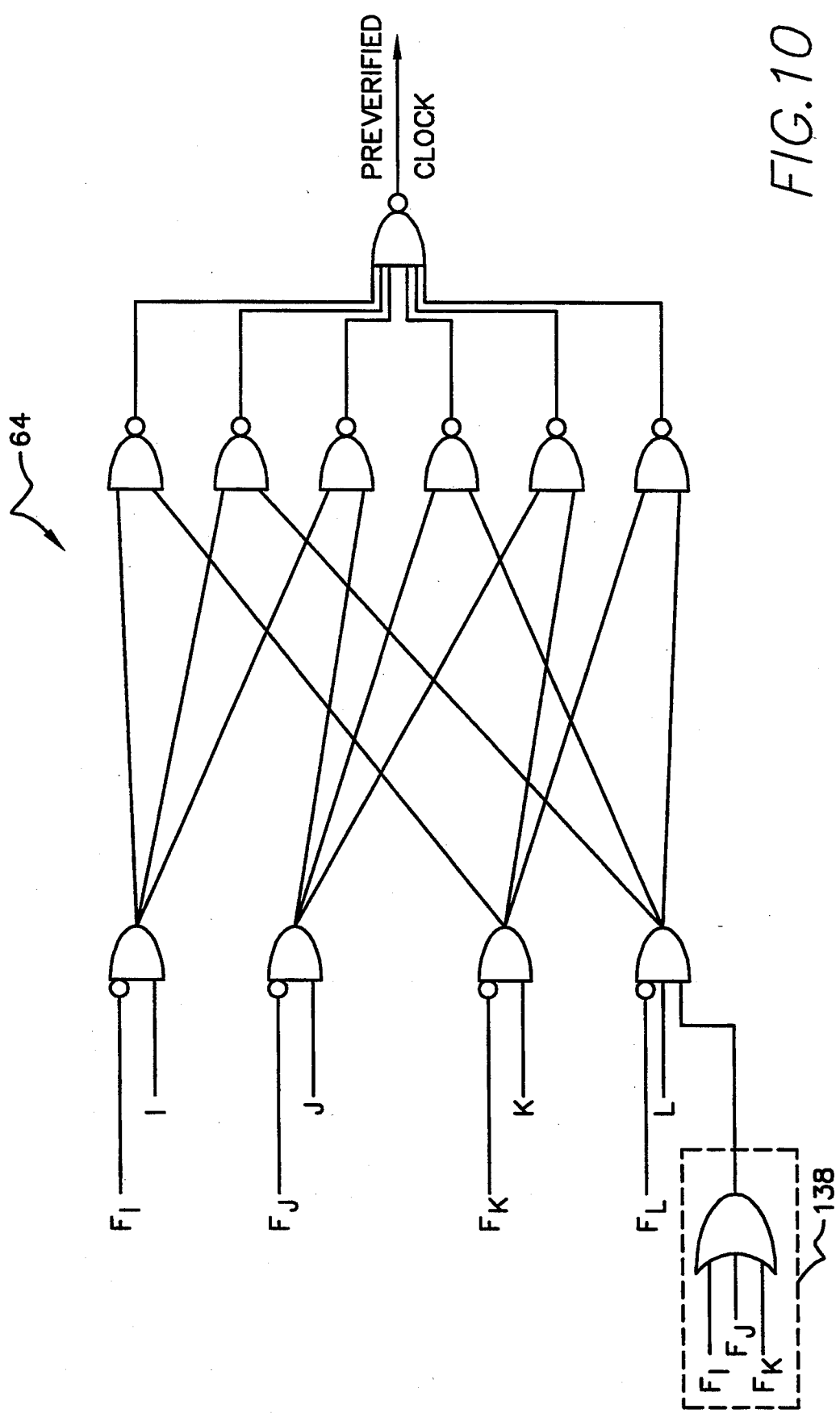
FIG. 10 is a schematic of the collector circuit of the clock receiver circuit.

Collector 64 integrates fault flags 98 and synchronous clock signals 70 from input clock managers 62, to implement the median voter scheme. FIG. 10 is a schematic of collector 64. The floater algorithm essentially searches for an agreeing signal pair, excluding faulty clocks and internal signals included only in the presence of faults. Three external clock signals I, J and K, internal clock signal L, and corresponding fault flags $F_i$, $F_j$, $F_k$ and $F_l$ to collector 64 results in a candidate reference clock signal (CRC) 68 with a certain logic as shown by the following formula.

$$CRC = IJ\overline{F_i}\overline{F_j} + IK\overline{F_i}\overline{F_k} + JK\overline{F_j}\overline{F_k} + \overline{F_i}(F_i + F_j + F_k)(IL\overline{F_i} + JL\overline{F_j} + KL\overline{F_k}).$$

Output signal 68 of collector 64 may be corrupted by noise; thus, that is why output signal 68 is referred to as a "candidate" reference clock.

The receiver located on the HEXAD is nearly identical to receiver circuit 20 within the fault tolerant clock. The only difference is a simple modification of collector 64. For a receiver of the HEXAD unit, all four clock modules 11, 12, 13 and 14 have identical roles or are treated the same as there is no distinction of an external- /internal clock. Thus, the collector voting algorithm for the HEXAD receiver merely searches for an agreeing signal pair. The candidate reference clock of the collector for the HEXAD receiver is shown in the following formula.

$$CRC = IJ\bar{F}i\bar{F}j + IK\bar{F}i\bar{F}k + IL\bar{F}i\bar{F}l + JK\bar{F}j\bar{F}k + JL\bar{F}j\bar{F}l + KL\bar{F}k\bar{F}l.$$

Figure 11:
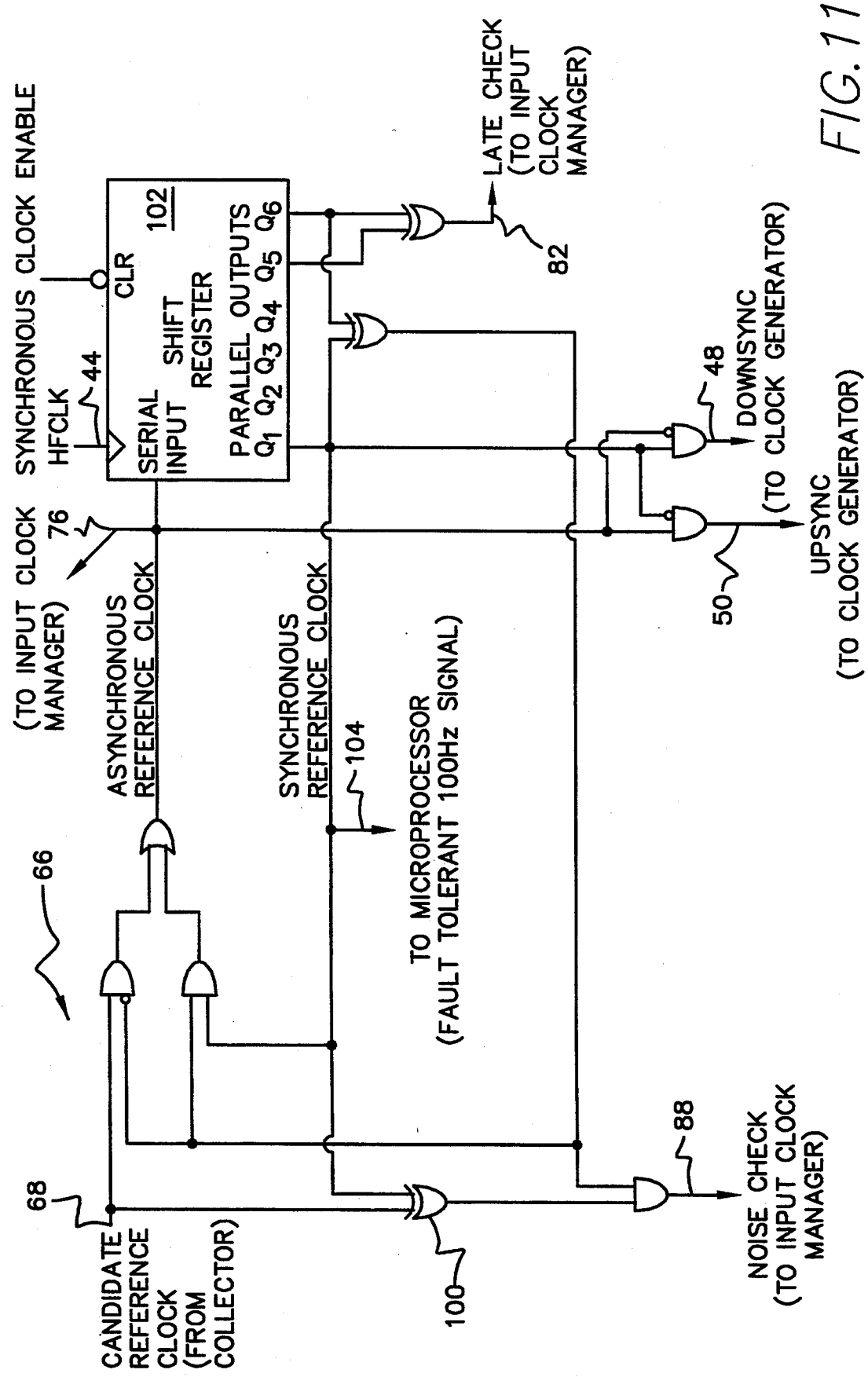
FIG. 11 is a schematic of the reference clock manager circuit of the clock receiver circuit.

FIG. 11 is a schematic of reference clock manager circuit 66. Reference clock manager 66, for instance, eliminates noise glitches from candidate reference clock signal 68. When a level transition occurs on candidate reference clock signal 68, exclusive OR-gate 100 is sequentially asserted for the next five cycles of HFCLK 44. During this period of assertion, candidate reference clock 68 is locked out and the input to shift register 102 is sent to the value of the first bit of shift register 102. Since the occurrence of a reference edge implies the existence of at least two recent input edges, all non-failed clocks will have transitioned by the time the candidate reference edge of signal 68 is applied again to reference clock manager 66. If the second clock edge seen by the clock module becomes corrupted by noise, a glitch occurs on candidate reference clock signal 68 before the occurrence of a third edge. When such a glitch occurs, noise check signal 88 is asserted at each of the four input clock managers 62. Thus, the noisy signals are detected and flagged as faulty. Reference clock manager 66 also provides late check signal 82 to input clock managers 62, several cycles after a level transition on the reference clock. Reference clock manager 66 also provides synchronization signals 48 and 50 to clock generator circuit 18, a synchronous reference clock signal 104 to local microprocessor 24, and an asynchronous reference clock signal 76 to the four input clock managers 62.

The 100 hertz and 1600 hertz outputs of receiver 20 and generator 18 circuits are gated by fault flags provided by receiver circuit 20. A clock module completely cuts off all of its 100 hertz and 1600 hertz output signals under either of the following conditions which are when the clock module detects itself as bad or when the clock detects the other three clock modules as bad. Additionally, if one clock module detects a second clock module as bad, the first clock module will cut off its 100 hertz output to that second clock module.

The interconnection of four clock modules 11, 12, 13 and 14 that make up the fault tolerant clock may be viewed as a tetrahedron. The tetrahedron is the topology of clock circuit 10 as shown in FIG. 12. Each edge of the tetrahedron has two point-to-point wires carrying a clock signal in each direction from one module to another, as is also shown in FIG. 1 above.

When a module detects a fault on the clock signal from any other module, it subsequently ignores signals from that module and ceases to broadcast to that module. The first act, ignoring inputs, essentially deletes one of one-directional lines in the fault tolerant clock configuration 10. The second act, cessation of broadcast, has the effect of generating a fault detection on the other clock, which then deletes the other one-directional line. When a module finds itself to be faulty, the entire module is removed from system 10, which corresponds to the removal of one of the nodes, i.e., vertices, of a tetrahedron.

Deletion of each one-directional link in FIG. 12 corresponds to the setting of a fault flag in the receiving module. The 12 links shown in FIG. 12 correspond to 12 fault flags. Each module also has a flag to indicate when it has found itself to be faulty, bringing the total number of fault flags to 16. The operational diagnostic task is to deduce the operational status of the overall clock system 10 by inspecting the 16 flags.

When the complete tetrahedron, as in FIG. 12, is intact, i.e., no faults have been detected, the overall clock circuit 10 is at least two-fail-operational. When at least one face of the tetrahedron is intact as shown in FIG. 13, the overall clock circuit 10 is at least one-fail-operational. When at least one edge of the tetrahedron is intact as shown in FIG. 14, the overall clock circuit 10 is at least operable.

In the two-fail-operational condition, all four clocks 11, 12, 13 and 14 operate properly and remain synchronized. In the one-fail-operational condition, at least three clocks (sometimes four) operate properly and remain synchronized. In the at least operable condition, at least two clocks (sometimes more) operate properly and remain synchronized. A larger number of physical faults in the stated tolerable number of failures, can occur without completely failing the circuit, particularly if numerous faults are within one module. Circuit 10 is operable if two clock modules in the communications between them are operating properly.

Besides clock signal connections, fault tolerant clock 10 has two other kinds of interconnections which are associated with a fault tolerant reset and the communication of fault flags. Fault tolerant reset wiring is essentially the same as that of clock 10. Fault tolerant reset interconnections have a tetrahedron topology as shown in FIG. 12.

FIG. 12 shows fault tolerant reset interconnection topology. For the reset mechanism, any fault flag generates a maintenance alert. This alert helps avoid the accumulation of a sufficient number of faults such that the reset mechanism would fail, meaning that clock circuit 10 would not start. Yet, one need not make a determination of the fail-operational status of the resent circuit (i.e., a determination of whether the circuit is one-fail-operational or merely fail safe) for the purpose of deciding on a dispatch alert. Once the reset has occurred, four clock modules 11, 12, 13 and 14 latch in the reset signal and thereafter remain independent of reset failures. The latch is part of the fault containment region of a clock module, so that the operational diagnostics for the clock interconnection will provide the correct decision regarding dispatch alert in the event that the latches fail. In sum, the reset completes its entire function at startup, so the mere fact that clock circuit 10 has started means that no dispatch alert need be generated in response to problems associated with the reset mechanism. If multiple reset failures cause quad clock 10 not to start, the dispatch alert is naturally generated.

Figure 15:
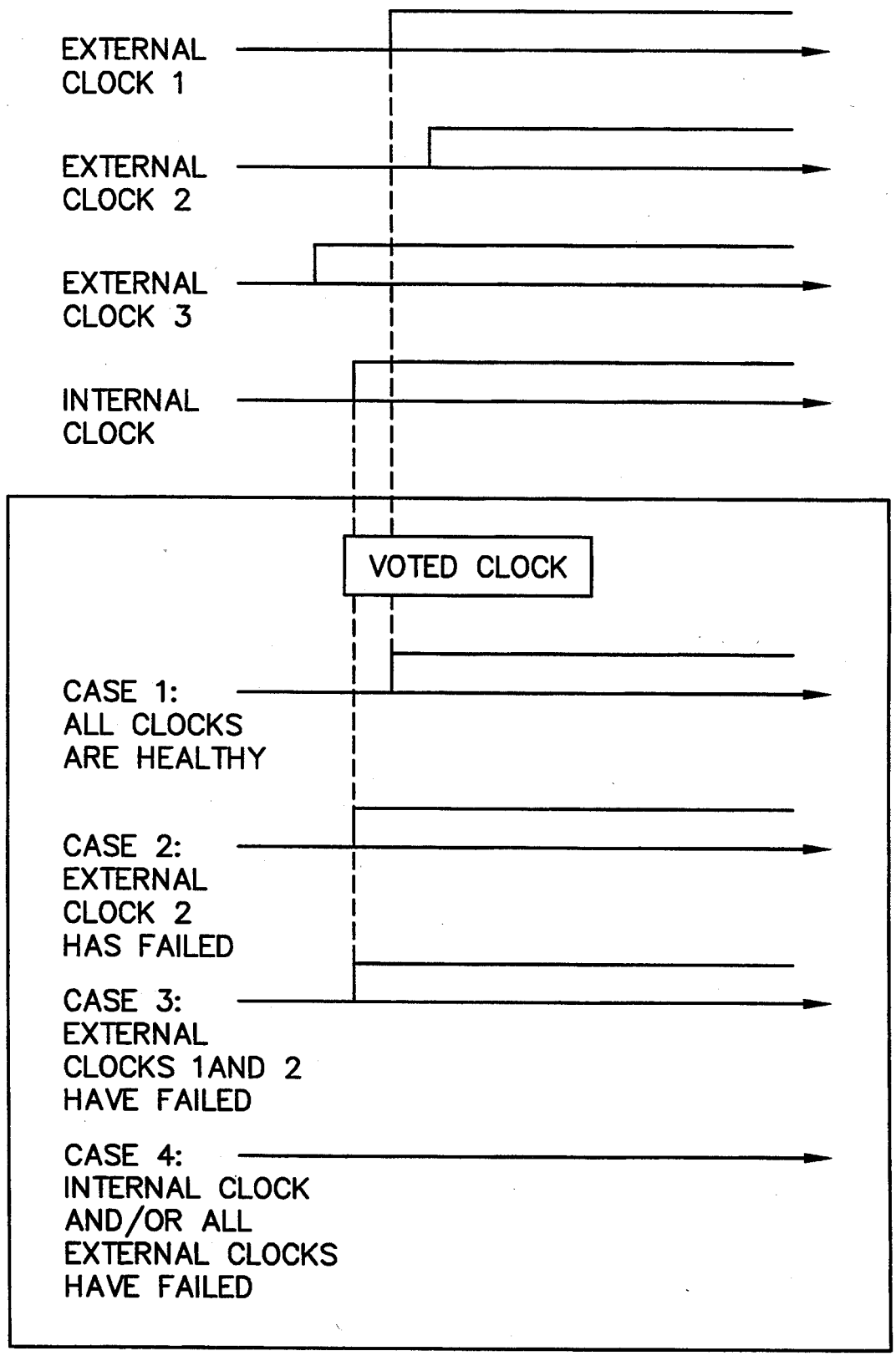
FIG. 15 shows a timing diagram of the synthesis of the voted clock.

Each clock module synchronizes its fault-tolerant clock to a voted clock signal. See FIG. 15. The voted signal is a function of the local, fault-tolerant clock and the three external clocks. Each clock module votes in a manner dictated by the number and types of faults that it has detected. FIG. 15 illustrates four cases. In the first case, if a clock module declares itself and the other three external clocks good, then the voted clock signal is the median of the three external clocks. In case two, if a clock module declares itself good but one of the three external clocks bad, then the voted clock signal is the median of the local and the two healthy external signals. In case three, if a clock module declares itself good but two of the three external clocks as bad, then the voted clock signal is the later of the internal and the healthy external signal. In case four, if a clock module declares either all three external clocks or itself bad, then no voted signal is produced, and the clock module is rendered inoperable.

In fault tolerant design, one needs to make assumptions on the class of faults to be tolerated. In the case of the fault-tolerant clock, there are numerous possible common circuit failures. Such failures include physical connection problems, complete integrated circuit failures, broad classes of failures of output or input buffers, circuit board shorts and open circuits, oscillator failures including slow drift out of specification, and board-isolated power supply failures. The term "single physical fault" includes any one of these faults.

From the prospective of clock circuit 10, all of those faults have two common characteristics which are observability and commonality. A fault is observable if it leads to clock edge observations which are out of a specified tolerance. That is, one or more clocks sees another clock as being out of specification. Such out-of-specification behavior leads to the setting of a fault flag.

With respect to commonality, a single physical fault can lead to the setting of one or more fault flags, but all of these flags will have one clock in common. For instance, if each of the fault flags is regarded as an accusation by one clock of a failure on the signal received from another clock, then all of the fault flags from a single physical fault have one clock in common. That is, a single clock is either the accuser or the accused in all cases. For example, clocks 1 and 2 could accuse clock 4 while clock 4 accuses clock 2. All of the accusations here involve clock 4 as either the accuser or the accused. FIG. 30 shows the accused/accuser format.

Although nearly all common faults have both observability and commonalty, a certain class of uncommon faults is not observable. Such faults are in the internal details of the clock module circuit which do not effect its operation but may effect its future operability. An example is the failure of fault flag latch which is not currently set and fails so as to be unsetable. Such faults are latent. Latent is a term taken in the sense in that latent faults do not affect the correctness of the fault-tolerant clock output to the outside world.

Although it is not feasible to detect all latent faults, all of the most important and likely latent faults are detected and reported to facilitate the generation of maintenance and/or dispatch alert, and the clock is fail-safe so that in the exceptionally rare event that several latent faults suddenly become active as a result of another single fault the consequences are tolerable with the present clock circuit 10 design.

Fault tolerant clock 10 can be considered as four nodes, i.e., clock modules, connected by 12 paths as shown in FIG. 12 wherein the 12 paths involve shared 100 hertz signals. Once a clock module has determined that the signal arriving from a second clock module is erroneous, the first clock module ignores the signal from the second clock. This is equivalent to removing a connection from the tetrahedron thereby resulting in a different network configuration. Many of the network 10 configurations are transient. A transient configuration will degenerate to a stable configuration, even in the absence of further faults. The stable configuration is fixed in absence of subsequent faults. The final, stable configuration also has a smaller number of links than the original, transient configuration. For example, in FIG. 16a the configuration is transient. Since module 4 does not communicate with modules 2 or 3, its verified clock is the slowest clock to be received considering itself and module 1. Four clock modules 11, 12, 13 and 14 tend to vary slightly from each other in frequency. Eventually, clock module four will be the slowest clock module. Even if the frequency error of clock module four is well within tolerance, it is synchronized to its own free-running clock generator. Modules 11, 12 and 13 are synchronized to each other, and module 14 eventually becomes unsynchronized from the rest of network 10. The latter situation is a final, stable configuration shown in FIG. 16b.

Figure 17A:
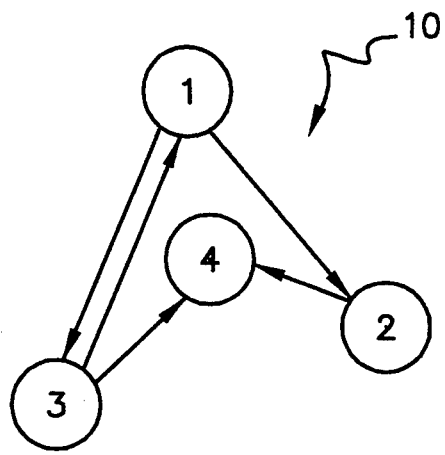
Figure 17B:
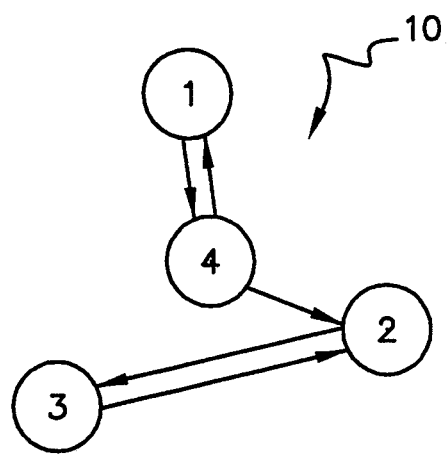
Figure 17C:
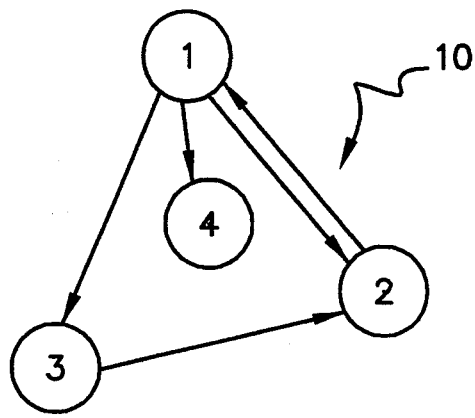

Fault tolerant clock 10 implements active link control. Clock modules 11, 12, 13 and 14 enforce a network topology which consists only of by-directional paths. If one clock declares a second clock "failed," it not only ignores the second clock, it also ceases transmission to that clock. Thus, if the second clock is actually healthy, it will declare the first clock "failed;" if the second clock is truly failed, it will already have ceased listening to the first clock. In either situation, the net result is the removal of a pair of network links. The analysis of clock 10 is greatly simplified if all networks with mono-directional paths are eliminated. Once a clock module has determined that the signal arriving from a second clock module is erroneous, it ignores the signal from the second module. This is equivalent to removing a link from the network. When multiple faults are considered, there are 4,096 possible circuit configurations. Focusing on configurations with only by-directional paths eliminates the need to analyze a large number of network topologies that incorporate mono-directional paths such as those in FIGS. 17a, b and c.

Figures 18A, 18B:
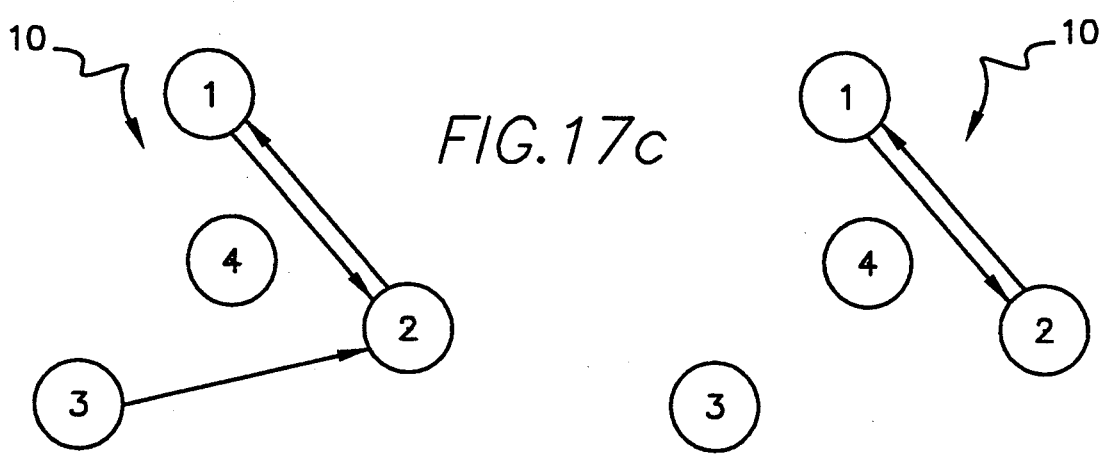
FIG. 18a is a diagram having a mono-directional link.
FIG. 18b is a diagram having no mono-directional links.

When mono-directional paths occur, some configurations that are transient can degenerate to a total system 10 failure. For example, in FIG. 18a, given the proper random perameters, clocks one and two can be driven out of synchronization by clock three thereby resulting in a total failure of clock ten. On the other hand, the configuration of FIG. 18b is stable; in the absence of further faults, clock modules 11 and 12 will remain synchronized to one another. In fact, all configurations that possess exclusively bi-directional links are either stable or degenerate to a stable, working clock configuration. The example of FIG. 18a is uncommon. In most cases, mono-directional links do not destabilize the clock or change its operational status.

Figure 19A:
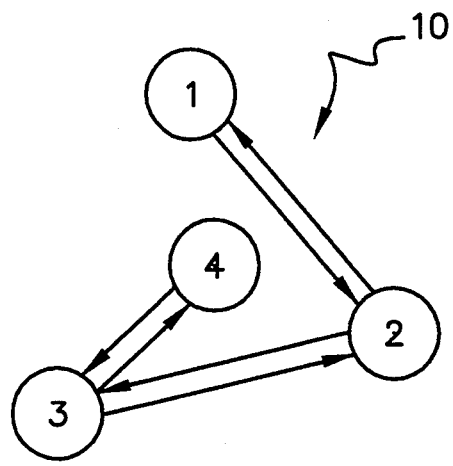
FIGS. 19a–c reveal three equivalent network topologies.
Figure 19B:
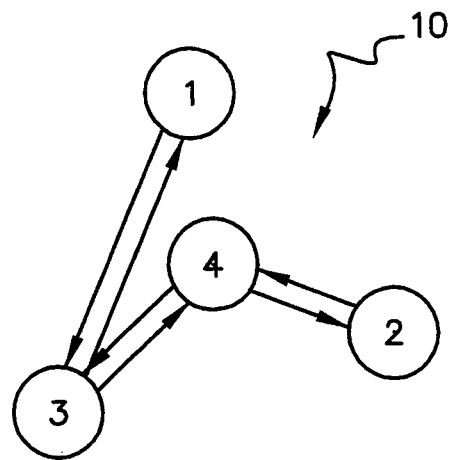
Figure 19C:
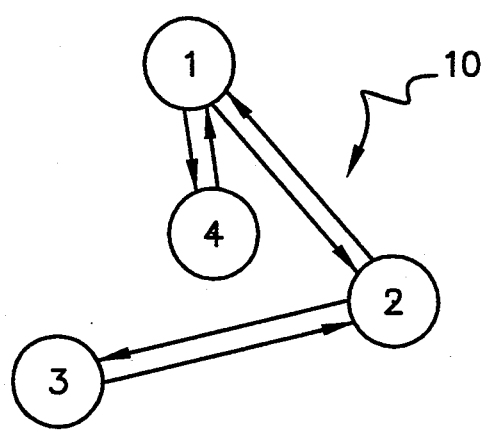

Since there are 4,096 network configurations, the computation time required to test these many topologies is prohibitive. However, many of the configurations are equivalent. For instance, the three configurations of FIGS. 19a, b and c are equivalent. For obtaining equivalency, the clock modules have been reordered through a four-dimensional rotation of the overlaying network topology, Thus, since the three circuits of FIGS. 19a, b and c are equivalent, only one needs to be tested. Also, all topologies having mono-directional paths are eliminated. Thus, only ten unique circuits remain and all can be tested within a reasonable amount of time. FIG. 20 reveals the ten by-directional circuit configurations. Configuration 1 of FIG. 20 is stable; barring any faults all four clock modules remain synchronized to one another indefinitely. Configuration 2 is stable. Configuration 3 is transient and degenerates to configuration 5 which is stable. Configuration 4 is transient and degenerates to a stable configuration 9 or 10, respectively. The arrows among configurations 3 to 5, 4 to 9 and 10, 6 to 10, 7 to 9 and 10, and 8 to 10, indicate degenerations from transient to stable configurations.

The clock configurations may be categorized according to the level of fault coverage. Configurations 4, 6, 7, 8, 9 and 10 are a single fault away from system 10 failure. Thus, these configurations are simply operable and fail-safe. Configurations 2, 3 and 5 are at least two faults away from system 10 failure. Thus, these three configurations are one-fail operable. Configuration 1 is the only configuration which is two-fail operable. In summary, any configuration which contains a complete tetrahedron is two-fail operable, or contains a complete face of a tetrahedron is one-fail operable, or contains an edge of a tetrahedron is operable and fail safe.

Figure 21:
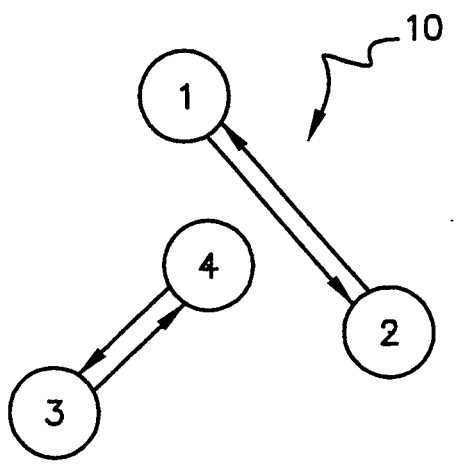
FIG. 21 is a topology diagram of a broken pair configuration.

FIG. 21 shows a clock circuit that has degenerated to two nonadjacent edges and is regarded as the broken pair configuration. This configuration is stable in the sense that each pair of clocks remains synchronized and the overall clock configuration does not change. However, the two pairs of clocks are not connected and do not remain synchronized to each other. Usually, there is a faster pair of clocks and a slower pair. When the two pairs of clocks drift far apart, it is necessary that one of the two pairs is deemed "correct" for systems synchronization to be maintained. The recipient of the clocks may take the first pair to be the earliest and vote out the two slow modules. Faults may cause the recipient system to track the second pair clocks instead.

Figure 25:
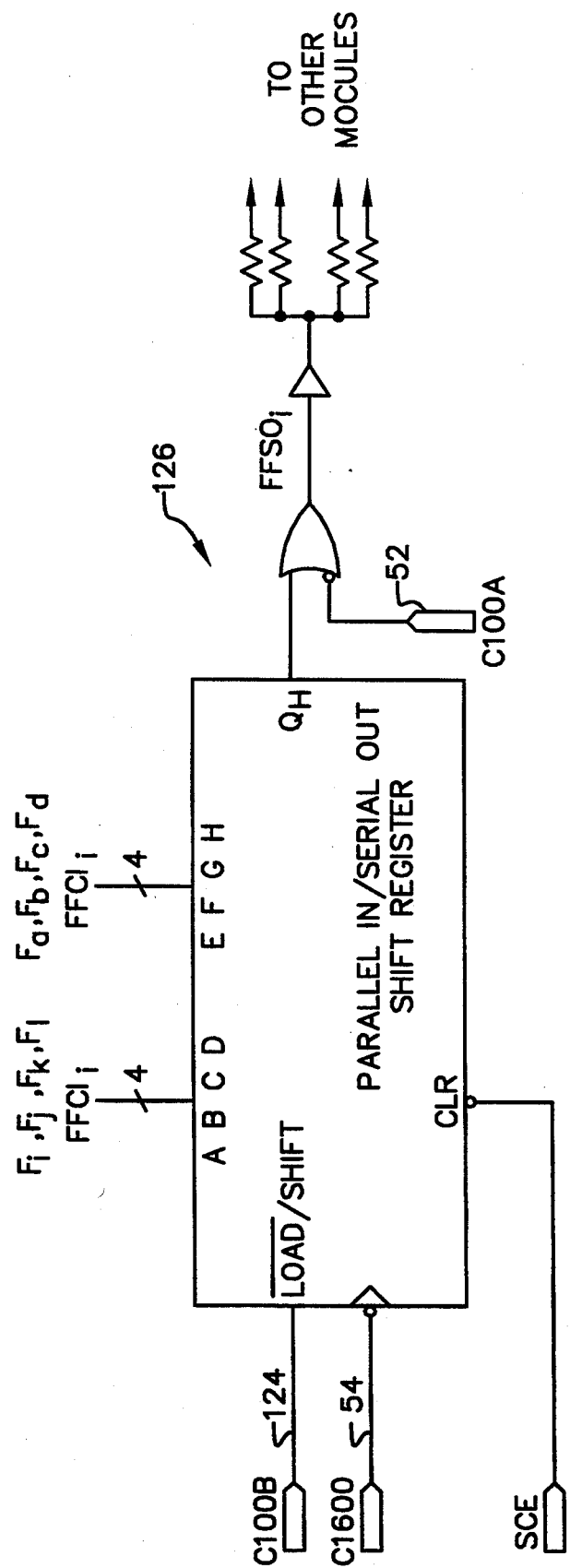
FIG. 25 is a diagram of a fault flag communication transmitter.
Figure 26A:
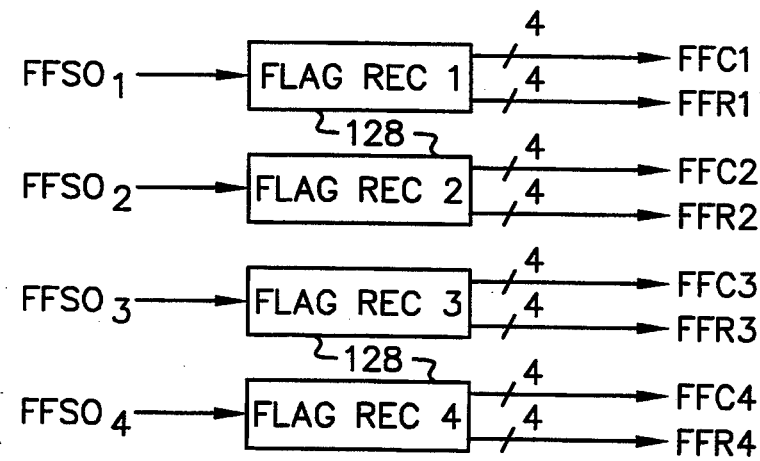
FIG. 26a shows set of fault flag communication flag receivers.
Figure 26B:
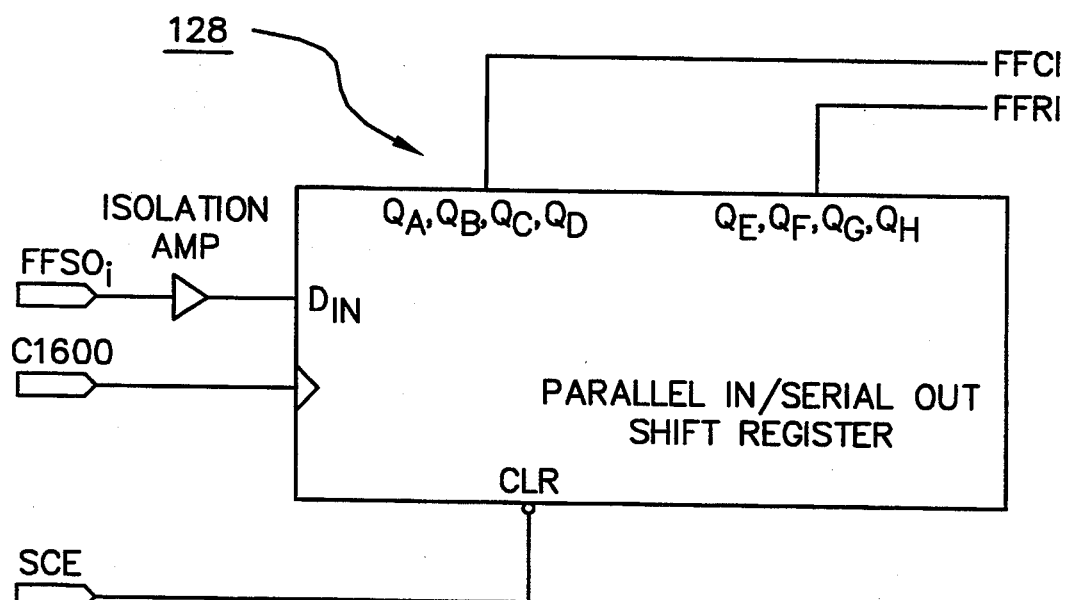
FIG. 26b is a more detailed diagram of a fault flag communication flag receiver.
Figure 27:
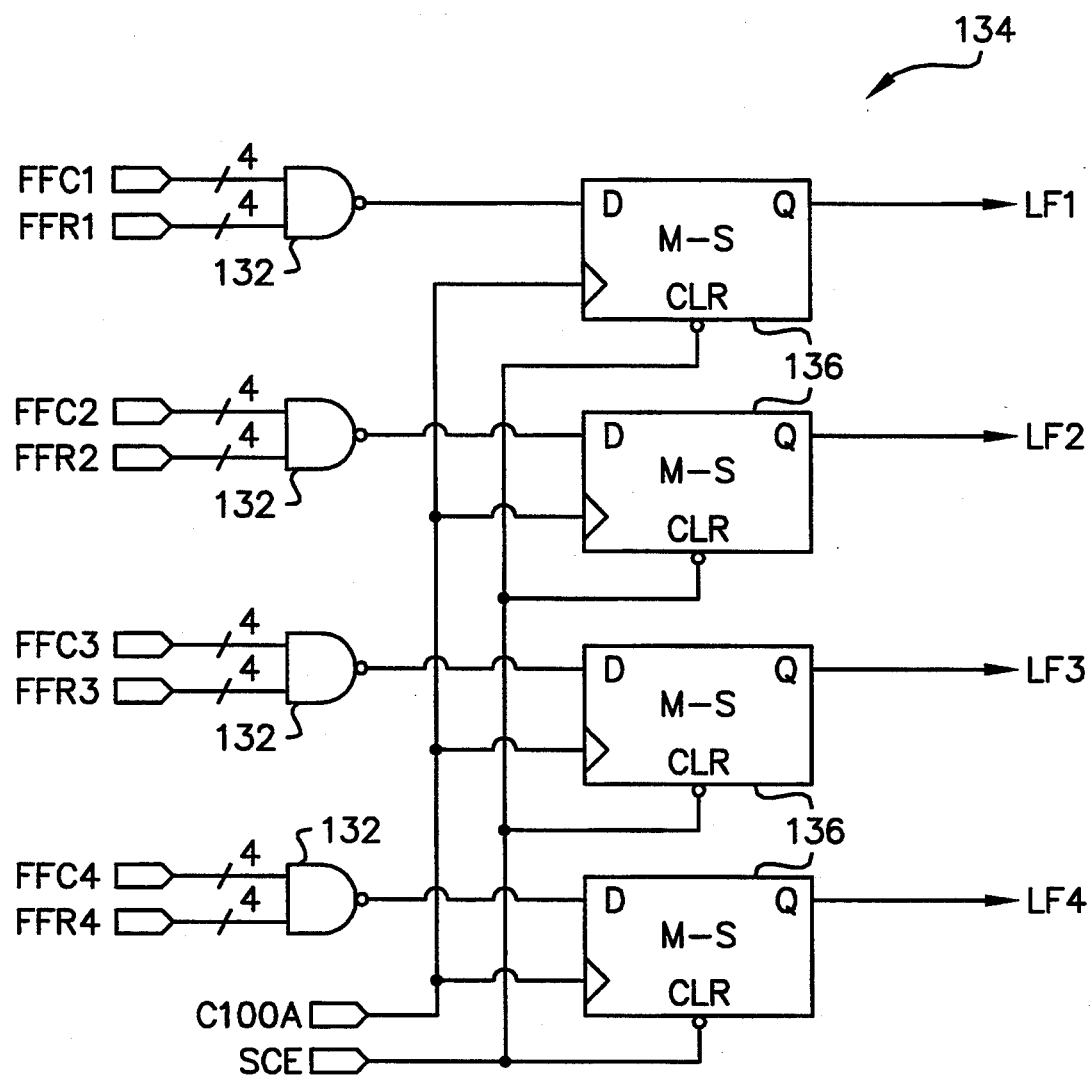
FIG. 27 shows a schematic of the fault flag communication line fail detection system.
Figure 28A:
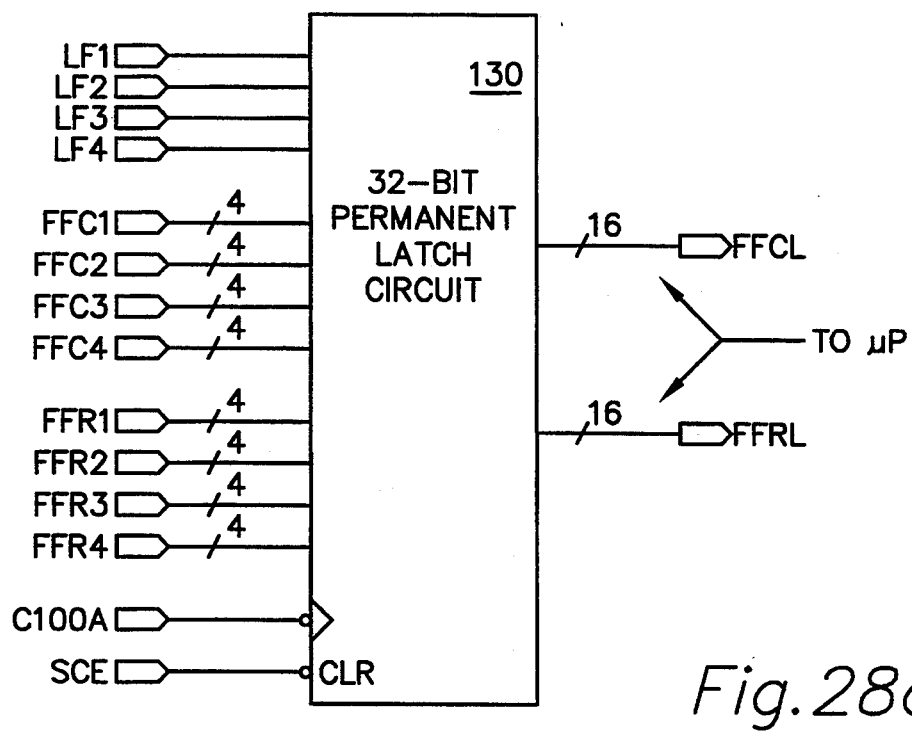
FIGS. 28a–b are diagrams of the fault flag permanent latch circuit and latch circuit detail for one bit, respectively.
Figure 28B:
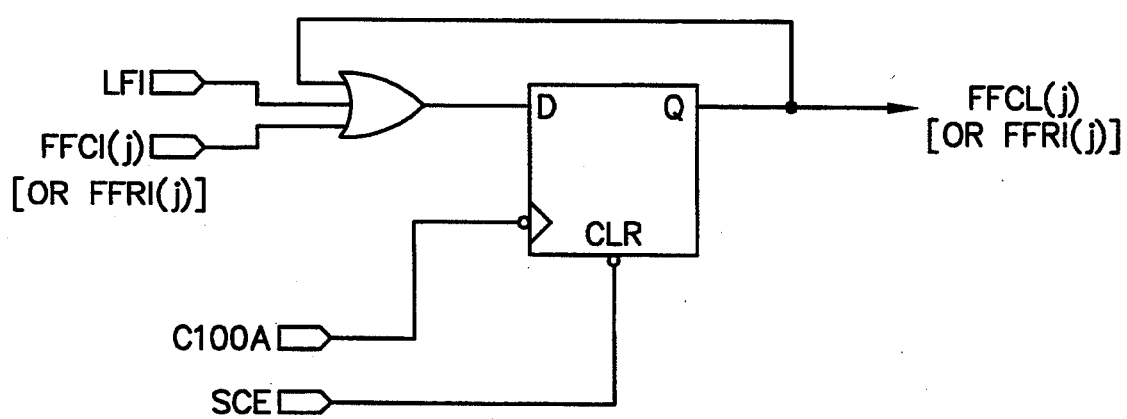

Operational diagnostics circuit 17 is new in view of the combination of clock phasing circuit 122, transmitter 126 having line-test signal generation, fault flag receiver 128, and fault flag permanent latching 130, which result in the capability of fault-tolerant status collection. Also diagnostics means 17 has branch-free combinational logic for operational status deduction. FIGS. 22-28 reveal the fault flag communication circuitry 17 of system 10. FIG. 22 is a functional block diagram of the fault flag circuitry 17; FIG. 23 is a timing diagram; FIGS. 24a and b pertain to clock phase means 122; FIG. 25 is a schematic of a flag communication transmitter 126; FIGS. 26a and b are schematics of a fault flag communication receiver 128; FIG. 27 is a schematic of fault flag communication line fail detection means 134; and FIGS. 28a and b are schematics of fault flag permanent latching circuitry 130.

Fault flags are transmitted from each module to every other module. Multiplexing all of the flags into the same line leads to 12 one-directional point-to-point connections between the modules. In order to make the modules truly identical (unaware of their slot in the card cage), the modules must also transmit their own fault flags to themselves off the board and back on which leads to a requirement for a total of 16 point-to-point wires for a fault flag communication.

Each module has eight flags to transmit. Using the available synchronized 1600 hertz signal, the modules transmit for 8 bits during one-half of the 100 hertz period. Timing details of the communication using rising and falling edges of the 1600 hertz clock guarantees that the fault flag communication is glitch-free. The other half of the 100 hertz period is utilized to transmit the logic level corresponding to "fault exists." In this manner, receiver can monitor the capability of the communication line to transmit "set" fault flags. When a line is unable to transmit a "fault exist" flag, the receiving circuitry assumes that a fault may exist. This assumption has the desirable effect of labeling the communications between the two clock modules as faulty when they actually are faulty.

The fault flag communication system is fault tolerant because the fault flags normally come in pairs, the operational status evaluation is permitted to be conservative, the flag communication faults are detected with high probability, and the fault flag communication is quad redundant.

When a fault flag has been set, a module which sets the flag ceases to transmit its clock output to the other module. That is, the entire two directional link between the modules is removed. Under normal operation, the second module will then note the removal of the link, and a second fault flag will be set. When this happens, only one of the two flags must be successfully communicated to the other modules for the proper diagnostic decision to be made, since the operational status depends on only complete edges.

A task of operational diagnostics is to determine only what is certain. When the communication of fault flags is faulty, the diagnostics cannot ascertain the operability of the clock links between two clocks, so diagnostics can assume the links are at fault. It is not necessary that the true status of the flags be known. It need only be known that the corresponding links in the clock topology cannot be relied upon. The operational status categorization (complete edge, complete face, complete tetrahedron) involves what is known to be working, not what is known to be failed.

The two types of errors are a "set flag" communicated when the flag is not set and in "unset flag" is communicated when the flag is actually set. The probability of the latter situation is small due to the continual checking of the ability of the communication link to send "set flag" logic levels. In fact, such testing of the communication link comprises 50% of the activity on the link. Under a failure, the worst is assumed—all of the flags are assumed to be set. Similarly, if a "set flag" is communicated when the actual flag is not set, the result is an indication of communication fault involving the transmitting module. Since the operational status characterisization involves what is known to be working and not what is known to be failed, the communication fault detection takes action by setting flags when in doubt.

The clock is quad redundant and the recipient system of the clock votes on the output of the various processor boards. If a single fault flag receiver has problems and sets flags, the corresponding processor can make a different status evaluation than the other processors. The recipient system of the clock will correctly call that processor board in error and a maintenance alert will be generated. If a single fault transmitter has problems, all the receivers will set flags. These flags will have single module in common, that is, the transmitting module. All modules will draw the same operational status information and the same board will be implicated by all. Again, a maintenance alert will be generated, which is the appropriate step when the circuit is not working properly.

Four separate processors can view four separate versions of the accumulated 32 fault flags to determine the operational status of clock circuit 10. The evaluation consists of Boolean logic expressions. If each processor evaluates the entire Boolean logic expression, it arrives at the correct status conclusion without branching. The absence of branching enables the four processors to complete the evaluation in the same number of machine cycles.

For reset fault status evaluation, the 16 reset fault flags are logically OR-ed together to generate a reset maintenance alert flag.

One wiring scheme for the four clock modules is one of several approaches for interconnections. In this description, several definitions are incorporated. "Card position number" or "absolute number" is the number of the clock module according to its card position. That is, the absolute number of a clock module on the card in the fourth position is number four. "Relative number" is the number of a clock module as it is regarded by another clock module. Each module has input pins for the signals from other clock modules. The signal coming into the first input of module 2 maybe coming from module 3. If so, then module 3 is regarded by module 2 to be clock number 1. That is, the number of module 3 relative to module 2 is number 1. FIG. 29 shows the correspondence between the absolute numbering and the relative numbering. This correspondence constitutes a definition of the interconnection wiring.

Fault flag ordering corresponds to the relative numbering scheme. For instance, when the module on card number 1 finds fault with its second input clock, it sets its second fault flag, which means, according to FIG. 29, that the module on card 1 is indicating a fault on the signal received from the module on card 3 (because of the "3/2" entry into the relevant box of FIG. 29).

The fault flag communication system collects the 16 fault flags. The collected 16 flags are in the same order on all four clock modules. The four bits from card 1 are the first four bits of the sixteen bit word, the four bits from card 2 are the next four bits, and so on. This format indicates where fault bits come from and FIG. 29 describes which card is implicated based on bit position and where the fault bits come from, which provides the meaning of the 16 fault flags as shown in FIG. 30.

Each fault flag involves an accuser and an accused. For each bit shown in FIG. 30, the numerator indicates the accused clock and the denominator indicates the accuser clock. FIG. 30 provides the information for indicating the Boolean logic expressions for the operational status of the circuit based on the complete tetrahedron, complete face and a complete edge of the clock tetrahedron in FIG. 12. Let $f_i$ denote the $i^{th}$ bit of the 16 bit fault flag word. Let $\bar{f}_i$ denote the compliment of $f_i$. Let "+" denote OR and "." denote AND. The "two-fail operability" status which corresponds to a complete tetrahedron may be denoted as $S_{2FO}$ and is given by $$S_{2FO} = \bar{f}_1 \bar{f}_2 \bar{f}_3 \bar{f}_4 \cdots \bar{f}_{16}.$$

It is required that the clocks do not implicate themselves as faulty. One "one-fail operability" status is equivalent to "there exists one complete face on the tetrahedron." The tetrahedron has four faces; one need only check the completeness of the four faces separately and OR them together to get the logical value of "one-fail operability." The completeness of the face involving clocks 2, 3 and 4 may be denoted by $S_{F234}$ and is given by the following $$S_{F1234} = \bar{f}_5 \bar{f}_6 \bar{f}_8 \bar{f}_9 \bar{f}_{11} \bar{f}_{12} \bar{f}_{14} \bar{f}_{15} \bar{f}_{16}.$$

That is, all bits in the fault flag word are OR-ed together except those which involve the module which is excluded from the face. The other face evaluations are analogous. Now "one-fail operability" is $S_{1FO} = S_{F234} + S_{F134} + S_{F124} + S_{F123}$. Likewise, the completeness of the edge between clocks 1 and 2 may be denoted by $S_{E12}$ which is given by $$S_{E12} = \bar{f}_1 \bar{f}_4 \bar{f}_7 \bar{f}_8$$

Then "operational and fail safe" is given by $$S_{OP} = S_{E12} + S_{E13} + S_{E14} + S_{E23} + S_{E24} + S_{E34}.$$

The present operational diagnostics do not implicate any particular module as being faulty. It merely gives the minimum guaranteed fault tolerance of clock circuit 10. Other kinds of diagnostics such as maintenance diagnostics would have to perform fault isolation which has not been done here.

To summarize, the invention is multiple-fail-operational fault-tolerant clock 10, having a plurality of identical modules 11, 12, 13, 14. Each module has a clock unit 115, wherein clock unit 115 contains a receiver 20 and a generator 18. Each module also has a reset means 16, connected to clock unit 115, for providing fault tolerant simultaneous start-up, and an operational diagnostics means 17, connected to clock unit 115 and to reset means 16 of each module 11, 12, 13, 14, for collecting fault information about clock units 115 of the plurality of modules 11, 12, 13, 14 (in a fault tolerant mode).

Clock unit 115 of each module 11, 12, 13, 14, has two point-to-point connections to clock unit 115 of every other module of the plurality of modules 11, 12, 13, 14. Reset means 16 of each module 11, 12, 13, 14, has two point-to-point connections to reset means 16 of every other module of the plurality of modules 11, 12, 13, 14. Operational diagnostic means 17 of each module has two point-to-point connections to operational diagnostic means 17 of every other module of the plurality of modules 11, 12, 13, 14.

Receiver 20 of each clock unit 115 has a plurality of input clock managers 62, connected to point-to-point connections of each clock unit 115, for storing recent past history of input clocks and for performing fault detection. Collector 64, connected to the plurality of input clock managers 62 of receiver 20 of each clock unit 115, produces a candidate reference clock signal wherein the reference clock signal is a fault tolerant clock signal with faults removed. A reference clock manager 66, connected to collector 64 and the plurality of input clock managers 62 of receiver 20, and to generator 18, produces a reference fault-tolerant clock input signal 118, synchronization signals 48, 50, and fault checking timing signals 76, 82, 88, wherein the timing signals indicate a time that the plurality of input clock managers 62 should check for a fault.

Generator 18 has a first counter 56 for receiving synchronization signals 48, 50 from receiver 20, for resetting a clock enable mechanism, for dividing down a high frequency clock signal, and for self-reloading when commanded; a second counter 58, connected to first counter 56, to clock enable mechanism and reset means 16, for receiving synchronization signals 48, 50 from receiver 20, and for generating 1600 and 100 hertz signals 54 and 52, respectively; and combinational logic means 116 connected to the first and second counters 56, 58 of generator 18, for receiving synchronization signals 48, 50 from receiver 20 and for detecting a slow fault of the external high frequency clock being used in clock unit 115 and transmitting a slow fault signal 146 to input clock managers 62.

Reset means 16 or clock enable 16 (FIG. 5) has combinational logic means 106, for obtaining a two fail operation or fail safe initialization, two out of four voter logic, having a plurality of inputs connected to three external clock enables 37, 38, 39 from other clock modules, having outputs for providing a clock enable 28 to the other clock modules, an internal clock enable 30 to outside of the fault tolerant clock which is an "early" power up reset and power up ready. Reset means 16 also has reset latch 110 for synchronizing the clock enable 30 to a crystal oscillator of the module and for latching the clock into an "on" position to keep the clock on while power is on, having a first input connected to output 30 of means 16, and having a second input connected to an internal clock reset 112. Reset fault detection logic circuit 108 is likewise part of reset means 16, and is for detecting hardware and communication faults involving the reset signals for resetting the overall clock (works collectively for all modules—resets overall collection of clocks), and has inputs connected to clock enables 37, 38, 39 from other modules, and connected to a nonvolatile memory 120 that records a previous fault latch state, and has outputs with fault flag signals connected to an operational diagnostics circuit, and an input connected to an internal clock reset which is an early clock reset (the early clock reset precedes a power up ready —as mentioned above).

The operational diagnostic means 17 or the fault flag communication system 17 is shown in FIG. 22 in conjunction with clock unit 15. FIG. 23 shows a waveform timing diagram of the clock signals and fault flag communication device signals for means 17. Operational diagnostic means 17 (FIGS. 22-29) has a clock phasing circuit 122 (FIGS. 22 and 24) for producing one additional clock signal 124 slightly out of phase from the fault tolerant clock output 52 of the same module (i.e., the circuit is specialized in that it uses both high and low frequencies—there is a need for a higher frequency clock for the fault tolerant module clock output), having inputs connected to both frequencies 52, 54 from the module and connected to synchronous clock enable 29 from reset circuit 110. Phasing circuit 122 is a flip-flop that waits for the rising edge of the 1600 Hz clock and provides a 1/32 cycle delay to the 100 Hz clock.

Operational diagnostic means also has a fault flag communications transmitter 126 (FIGS. 22 and 25) for transmitting a fault flag status of the clock module 11, for example, to operational diagnostic means 17 of the other modules 12, 13, 14—clock reset which processes flags—wherein each module 11, 12, 13, 14 has eight flags independent of others and each of the modules receives 24 flags plus its own 8 flags, 4 clock flags and 4 reset flags—one from each module—wherein each flag is an opinion by the module of the other modules including itself (4+4×4), and its own module's inputs are connected to the outputs of clock phasing circuit 122 and to fault flags which are from reset circuit 16 and clock receiver circuit 20. Transmitter 126 has an output that outputs serial data to other operational diagnostic circuits 17 on the other modules, and each flag has a function for generating line test signals which are outputs which enable receiver 128 to detect if there is a problem with the communication line. These outputs are set for fifty percent of the time through the communication line as the communication line is determined to be working when not used.

Fault flag receiver 128 (FIGS. 22 and 26) is also part of operational diagnostic means 17, and is for converting serial fault flag data into parallel flag data (to get all the fault flags simultaneously available to the combinational logic 132 for processing). Receiver 128 has inputs connected to outputs of fault flag communications transmitters 126 on all modules and to clock phasing circuit 122 on the same module, and has outputs being parallel fault flags connected to 32 bit fault flag latch 130 (FIGS. 29, 30). Line fail detection circuit 134 (FIGS. 22 and 27) is for detecting when fault flag communication lines are unable to transmit fault flags. Inputs of logic 132 are connected to parallel fault flags from fault flag receiver 128 and to a clock signal (100 Hz clock signal—a fault tolerant clock signal in the module) from clock phasing circuit 122. The outputs of master-slave flip-flops 136 are line fail flags to flag latch 130 on the module.

Fault flag latch 130 (FIGS. 22 and 28) is for merging the line fail flags and the parallel fault flags to produce a permanently latched 32 bit fault flag word. The inputs of latch 130 are the line fail flags from the line fail detection circuit 134 and the parallel fault flags from the fault flag receiver 128, and the 100 Hz fault tolerant clock from the clock phasing circuit 122. Fault flag latch 130 outputs a 32 bit fault flag word to microprocessor 24 or to the combinational logic (implemented in hardware, firmware or software in terms of Boolean logic, as shown in the above-noted expressions which indicate the clock system and the clock reset mechanism to be in a two-fail-operational mode, one-fail-operational mode or zero-fail operational mode, respectively), wherein each module 11, 12, 13, 14 has its own 32 bit word.

Figure 31A:
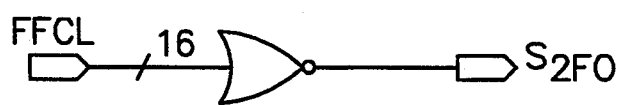
FIGS. 31a–f are schematics of the combinational logic for operational determinations of the clock and reset systems.
Figure 31B:
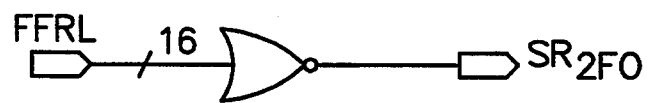

FIG. 31a shows logic 142 for 16 clock fault flag (FFCL) inputs for output $S_{2FO}$. If $S_{2FO}=1$, then the clock system is two-fail-operational. FIG. 31b reveals logic 144 for 16 reset fault flag (FFRL) inputs for output $SR_{2FO}$. If $SR_{2FO}=1$, then the clock reset mechanism is two-fail-operational. The fault system for the start-up or reset mechanism is distinct from the fault system for the clock.

Figure 31C:
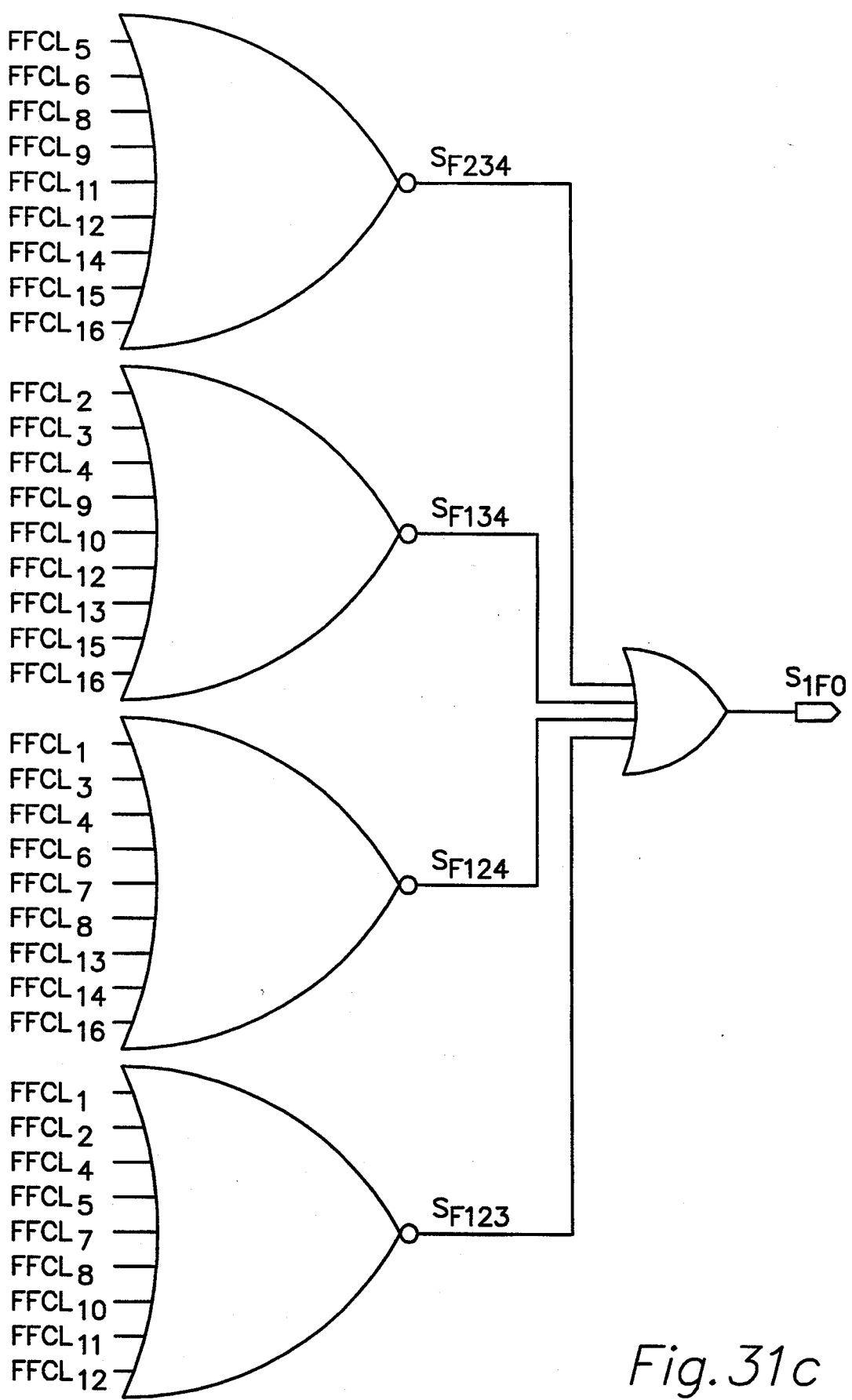
Figure 31D:
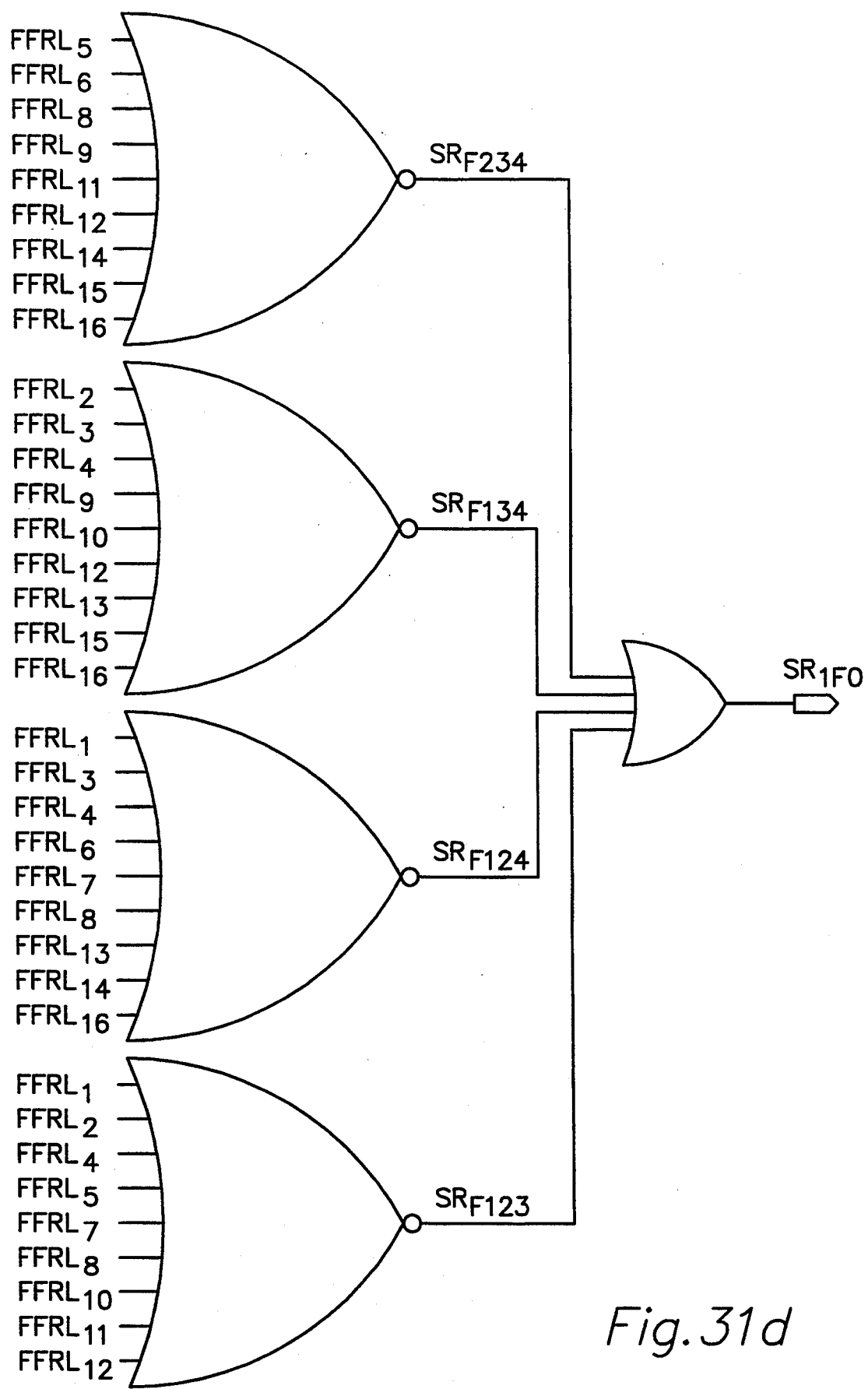
Figure 31E:
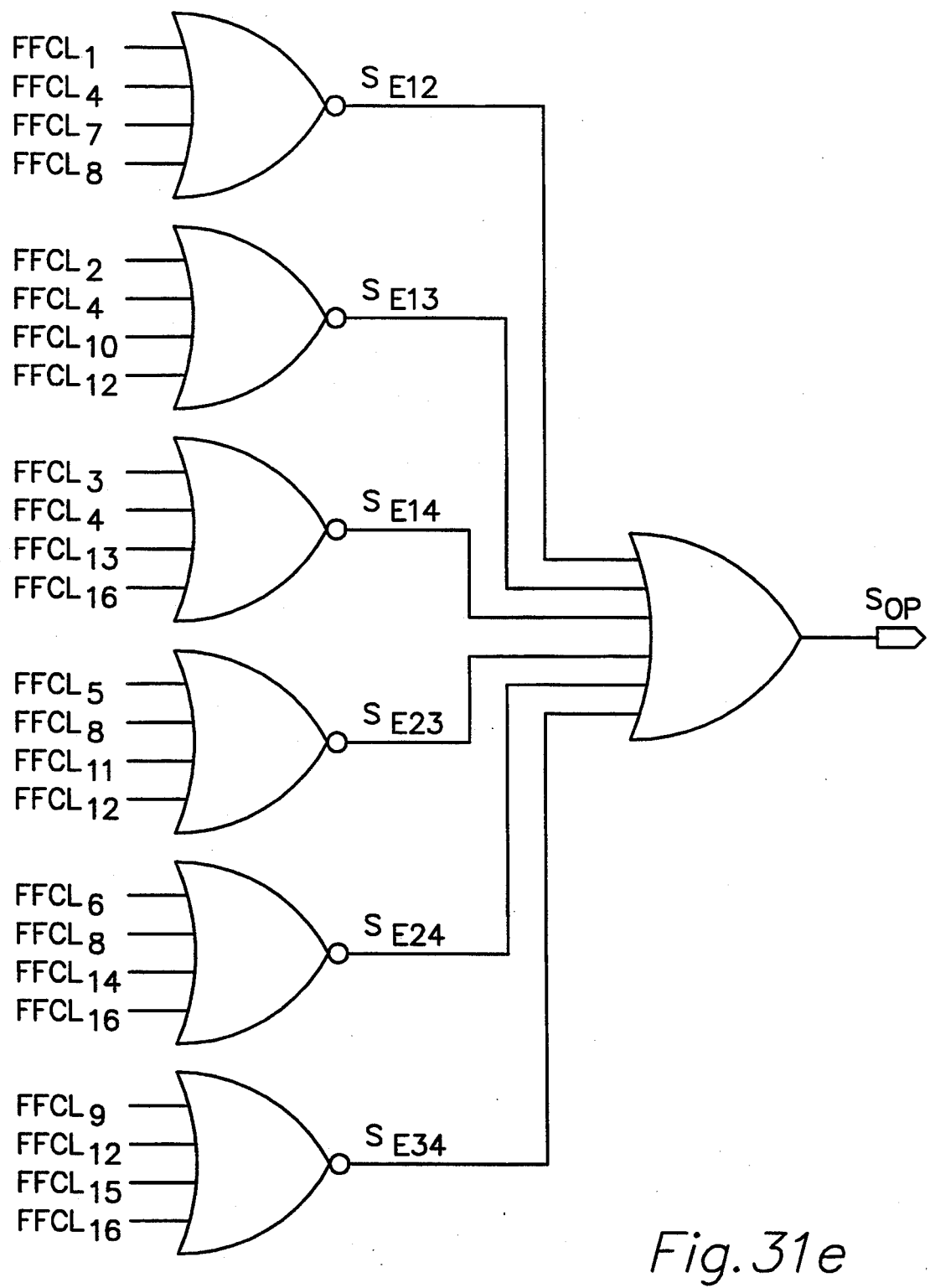
Figure 31F:
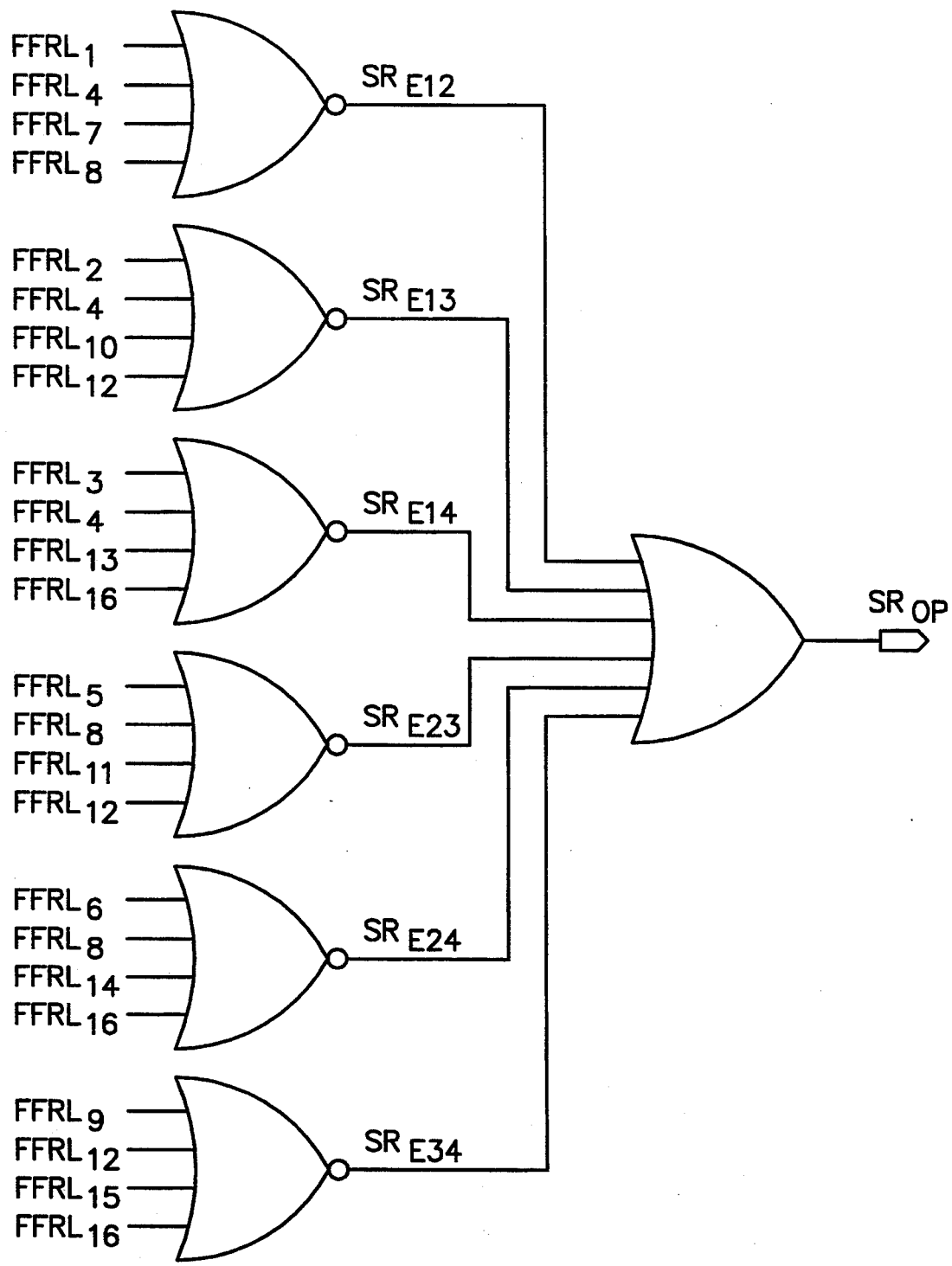

FIG. 31c is the logic for clock fault flag inputs which are utilized for an $S_{1FO}$ output. If $S_{1FO}=1$, then the clock system is at least one-fail operational. $FFCL_i$ represents the $i^{th}$ element of the 16 bit word FFCL for which the ordering is shown in FIG. 30. FIG. 31d is the logic for reset fault flag inputs which are utilized for an $SR_{1FO}$ output. If $SR_{1FO}=1$, then the reset circuit is at least one-fail operational. The $i^{th}$ term of $FFRL_i$ represents the $i^{th}$ element of the 16 bit word FFRL. FIG. 31c is the logic for clock fault flag inputs which are utilized for an $S_{op}$ output. If $S_{op}=1$, then the clock system is at least operational and fail-safe. FIG. 31f is the logic for reset circuit fault flag inputs which are utilized for an $SR_{op}$ output. If $SR_{op}=1$, then the clock reset mechanism or circuit is at least operational and fail safe.

We claim:

1. A two-fail-operational fault-tolerant multiple clock system comprising:
   a first clock module;
   a second clock module connected to said first clock module;
   a third clock module connected to said first clock module and second clock module; and
   a fourth clock module connected to said first clock module, second clock module and third clock module; and
   wherein:

said first clock module comprises:
- a clock generator for outputting a first clock signal;
- a clock receiver, connected to said clock generator and to said second, third and fourth clock modules for monitoring said second, third and fourth clock modules and providing commands to synchronize said clock generator to a fault-tolerant clock signal derived from said first, second, third and fourth clock modules;
- a reset means, connected to said clock receiver and to said second, third and fourth clock modules for providing a synchronized enable to said clock receiver and to said second, third and fourth clock modules;
- a fault transmitter, connected to said reset means, to said clock receiver, and to said second, third and fourth clock modules, for transmitting fault status information maintained by said first clock module, to said second, third and fourth clock modules;
- a fault receiver, connected to said fault transmitter and to said second, third and fourth clock modules, for receiving fault status information from said fault transmitter and from second, third and fourth clock modules;
- a clock phasing circuit, connected to said clock generator, for producing a second clock signal slightly out of phase from the first clock signal;
- a line fail detector, connected to said clock phasing circuit and to said fault receiver, for detecting failure to receive fault status information from said second, third and fourth clock modules; and
- a latch, connected to said clock phasing circuit, said fault receiver, and said line fail detector, for producing a latched fault word indicating a two, one or zero fail operational mode of the clock system;

said second clock module comprises:
- a clock generator for outputting a first clock signal;
- a clock receiver, connected to said clock generator and to said first, third and fourth clock modules, for monitoring said first, third and fourth clock modules and providing commands to synchronize said clock generator to a fault-tolerant clock signal derived from said first, second, third and fourth clock modules;
- a reset means, connected to said clock receiver and to said first, third and fourth clock modules, for providing a synchronized enable to said clock receiver and to said first, third and fourth clock modules;
- a fault transmitter, connected to said reset means to said clock receiver, and to said first, third and fourth clock modules, for transmitting fault status information maintained by said second clock module to said first, third and fourth clock modules;
- a fault receiver, connected to said fault transmitter and to said first, third and fourth clock modules, for receiving fault status information from said fault transmitter and from first, third and fourth clock modules;
- a clock phasing circuit, connected to said clock generator, for producing a second clock signal slightly out of phase from the first clock signal;
- a line fail detector, connected to said clock phasing circuit and to said fault receiver, for detecting failure to receive fault status information from said first, third and fourth clock modules; and
- a latch, connected to said clock phasing circuit, said fault receiver, and said line fail detector, for producing a latched fault word indicating a two, one or zero fail operational mode of the clock system;

said third clock module comprises:
- a clock generator for outputting a first clock signal;
- a clock receiver, connected to said clock generator and to said first, second and fourth clock modules, for monitoring said first, second and fourth clock modules and providing commands to synchronize said clock generator to a fault-tolerant clock signal derived from said first, second, third and fourth clock modules;
- a reset means, connected to said clock receiver and to said first, second and fourth clock modules, for providing a synchronized enable to said clock receiver and to said first, second and fourth clock modules;
- a fault transmitter, connected to said reset means, to said clock receiver, and to said first, second and fourth clock modules, for transmitting fault status information maintained by said third clock module, to said first, second and fourth clock modules;
- a fault receiver, connected to said fault transmitter and to said first, second and fourth clock modules, for receiving fault status information from said fault transmitter and from first, second and fourth clock modules;
- a clock phasing circuit, connected to said clock generator, for producing a second clock signal slightly out of phase from the first clock signal;
- a line fail detector, connected to said clock phasing circuit and to said fault receiver, for detecting failure to receive fault status information from said first, second and fourth clock modules; and
- a latch, connected to said clock phasing circuit, said fault receiver, and said line fail detector, for producing a latched fault word indicating a two, one or zero fail operational mode of the clock system; and said fourth clock module comprises:
- a clock generator for outputting a first clock signal;
- a clock receiver, connected to said clock generator and to said first, second and third clock modules, for monitoring said first, second and third clock modules and providing commands to synchronize said clock generator to a fault-tolerant clock signal derived from said first, second, third and fourth clock modules;
- a reset means, connected to said clock receiver and to said first, second and third clock modules, for providing a synchronized enable to said clock receiver and to said first, second and third clock modules;
- a fault transmitter, connected to said reset means, to said clock receiver, and to said first, second and third clock modules, for transmitting fault status information maintained by said fourth clock module, to said first, second and third clock modules;
- a fault receiver connected to said fault transmitter and to said first, second and third clock modules, for receiving fault status information from said fault transmitter and from first, second and third clock modules;

a clock phasing circuit, connected to said clock generator, for producing a second clock signal slightly out of phase from the first clock signal;

a line fail detector, connected to said clock phasing circuit and to said fault receiver, for detecting failure to receive fault status information from said first, second and third clock modules; and a latch, connected to said clock phasing circuit, said fault receiver, and said line fail detector, for producing a latched fault word indicating a two, one or zero fail operational mode of the clock system.

2. A two-fail-operational fault-tolerant multiple clock system comprising:

a first clock module;

a second clock module connected to said first clock module;

a third clock module connected to said first clock module and second clock module; and a fourth clock module connected to said first clock module, second and third clock modules; and wherein:

said first clock module comprises:

a clock unit wherein said clock unit comprises:

a clock generator for generating a clock signal; and a clock receiver, connected to said clock generator, for providing synchronization signals to said clock generator;

reset means, connected to said clock receiver, to said clock generator of said clock unit and to said second, third and fourth clock modules, for providing fault-tolerant simultaneous start-up of said clock unit; and operational diagnostics means, connected to said clock receiver, to said reset means and to said second, third and fourth clock modules;

said second clock module comprises:

a clock unit wherein said clock unit comprises:

a clock generator for generating a clock signal; and a clock receiver, connected to said clock generator, for providing synchronization signals to said clock generator;

reset means, connected to said clock receiver, to said clock generator of said clock unit and to said first, third and fourth clock modules, for providing fault-tolerant simultaneous start-up of said clock unit; and operational diagnostics means, connected to said clock receiver, to said reset means and to said first, third and fourth clock modules;

said third clock module comprises:

a clock unit wherein said clock unit comprises:

a clock generator for generating a clock signal; and a clock receiver, connected to said clock generator, for providing synchronization signals to said clock generator;

reset means, connected to said clock receiver, to said clock generator of said clock unit and to said first, second and fourth clock modules, for providing fault-tolerant simultaneous start-up of said clock unit; and operational diagnostics means, connected to said clock receiver, to said reset means and to said first, second and fourth clock modules; and said fourth clock module comprises:

a clock unit wherein said clock unit comprises:

a clock generator for generating a clock signal; and a clock receiver, connected to said clock generator, for providing synchronization signals to said clock generator;

reset means, connected to said clock receiver, to said clock generator of said clock unit and to said first, second and third clock modules, for providing fault-tolerant simultaneous start-up of said clock unit; and operational diagnostics means, connected to said clock receiver, to said reset means and to said first, second and third clock modules.

3. The fault-tolerant multiple clock system of claim 2 wherein each clock receiver comprises:

a plurality of input clock managers, connected to each clock unit of said first, second, third and fourth clock modules;

a collector, connected to said plurality of input clock managers, for producing a candidate reference clock signal wherein the candidate reference clock signal is a fault-tolerant clock signal having faults removed; and a reference clock manager, connected to said collector and to said plurality of input clock managers, and to said clock generator, for producing a reference fault-tolerant clock input signal, synchronization signals and fault-checking timing signals wherein said timing signals indicate a time that said plurality of input clock managers check for a fault.

4. The fault-tolerant multiple clock system of claim 3 wherein each said clock generator comprises:

a first counter, connected to said reference clock manager and to said reset means, for reducing the frequency of the clock signal;

a second counter, connected to said first counter, to said reset means and to said reference clock manager, for converting the clock signal to other frequencies; and combinational logic means, connected to said first and second counters, to said plurality of input clock managers and to said reference clock manager, for receiving at least one synchronization signal from said reference clock manager and detecting a slow fault in an external high frequency signal.

5. The fault-tolerant multiple clock system of claim 4 wherein each said reset means comprises:

combinational logic means, connected to other reset means of said first, second, third and fourth clock modules, for providing clock enable signals to reset means of said first, second, third and fourth clock modules;

reset latch, connected to said clock receiver, for synchronizing said reset means to an oscillator, and for latching said clock unit in an on status; and reset fault detection logic, connected to said combinational logic, to said reset latch and to said clock receiver, for detecting faults of said reset means, and connected to said reset means of said first, second, third and fourth clock modules.

6. The fault tolerant multiple clock system of claim 5 wherein each said operational diagnostic means comprises:
- clock phasing means, connected to said clock generator and to said reset means, for providing an additional clock signal slightly out of phase relative to the fault tolerant clock signal;
- a fault flag transmitter, connected to said reset means, to clock phasing means, to said clock unit, and to said first, second, third and fourth clock modules, for transmitting fault flags between said first, second, third and fourth clock modules;
- a plurality fault flag receivers, connected to said first, second, third and fourth clock modules, to said fault flag transmitter, and to said clock phasing means, for receiving fault flags from said fault flag transmitter of said first, second, third and fourth clock modules;
- a line fail detector, connected to said plurality of fault flag receivers and to said clock phasing means, for determining failure of fault flag transmission and receipt; and
- a fault flag latch, connected to said line fail detector, to said plurality of fault flag receivers and to said clock phasing means, for outputting an indication of the operational mode of said two-fail-operational fault tolerant multiple clock system.

* * * * *